(12) United States Patent
Singi et al.

(10) Patent No.: US 12,019,776 B2
(45) Date of Patent: Jun. 25, 2024

(54) POLICY-BASED APPLICATION ARCHITECTURE GENERATION

(71) Applicant: ACCENTURE GLOBAL SOLUTIONS LIMITED, Dublin (IE)

(72) Inventors: Kapil Singi, Bangalore (IN); Vikrant Kaulgud, Pune (IN); Kanchanjot Kaur Phokela, New Delhi (IN); Kishore P. Durg, Bangalore (IN); Swapnajeet Gon Choudhury, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 272 days.

(21) Appl. No.: 17/733,726

(22) Filed: Apr. 29, 2022

(65) Prior Publication Data

US 2022/0350911 A1    Nov. 3, 2022

(30) Foreign Application Priority Data

Apr. 30, 2021    (IN) .............................. 202111019975

(51) Int. Cl.
  *G06N 5/022*    (2023.01)
  *G06F 16/2455*  (2019.01)
  (Continued)

(52) U.S. Cl.
  CPC .... *G06F 21/6218* (2013.01); *G06F 16/24564* (2019.01); *G06F 16/2457* (2019.01); *G06F 16/2458* (2019.01); *G06N 5/022* (2013.01)

(58) Field of Classification Search
  CPC .......... G06F 21/6218; G06F 16/24564; G06F 16/2457; G06F 16/2458; G06F 16/24575; G06N 5/022
  See application file for complete search history.

(56) References Cited

U.S. PATENT DOCUMENTS

| 10,915,970 B1* | 2/2021 | Wang ................... G06Q 40/123 |
| 2008/0168135 A1* | 7/2008 | Redlich ............... G06F 21/6218 |
| | | 709/204 |

(Continued)

OTHER PUBLICATIONS

Manyika, James, and Charles Roxburgh, "The great transformer: The impact of the Internet on economic growth and prosperity." McKinsey Global Institute Oct. 2011, 10 pages.

(Continued)

*Primary Examiner* — Aftab N. Khan
(74) *Attorney, Agent, or Firm* — Mannava & Kang, P.C.

(57) ABSTRACT

In some examples, policy-based application architecture generation may include generating, based on a knowledge model schema, data residency policies, and a data classification ontology, a knowledge model, and determining, based on the knowledge model, whether an application includes regulated data. Based on an analysis of application data and user data, user location and regulated data insights may be generated to determine location specific data residency policies. Location specific regulated data in-flow and data source hosted location insights may be analyzed to determine a location compliance assessment that includes an indication of whether a location associated with the application is compliant or not compliant with the location specific data residency policies. Based on an indication of non-compliance, a strategy may be generated for compliance of application architecture for the application with the location specific data residency policies, and re-architecting of the application architecture may be implemented.

20 Claims, 35 Drawing Sheets

(51) Int. Cl.
G06F 16/2457 (2019.01)
G06F 16/2458 (2019.01)
G06F 21/62 (2013.01)

(56) References Cited

U.S. PATENT DOCUMENTS

| | | | | |
|---|---|---|---|---|
| 2009/0205018 | A1* | 8/2009 | Ferraiolo | H04L 63/102 |
| | | | | 707/999.103 |
| 2009/0248586 | A1* | 10/2009 | Kaisermayr | G06Q 30/06 |
| | | | | 705/400 |
| 2009/0265288 | A1* | 10/2009 | Chakravarty | G06N 5/022 |
| | | | | 706/11 |
| 2011/0082845 | A1* | 4/2011 | Padala | G06F 16/24564 |
| | | | | 707/E17.014 |
| 2011/0126275 | A1* | 5/2011 | Anderson | H04L 63/14 |
| | | | | 726/8 |
| 2011/0160986 | A1* | 6/2011 | Wu | G08G 1/0962 |
| | | | | 701/117 |
| 2012/0311519 | A1* | 12/2012 | Kennaley | G06N 5/04 |
| | | | | 717/101 |
| 2015/0142719 | A1* | 5/2015 | Behuria | G06N 20/00 |
| | | | | 707/610 |
| 2021/0250358 | A1* | 8/2021 | Dumitru | H04L 67/1097 |
| 2022/0327208 | A1* | 10/2022 | Karr | G06F 12/0246 |

OTHER PUBLICATIONS

Alam, Tanweer. "Cloud Computing and its role in the Information Technology." IAIC Transactions on Sustainable Digital Innovation (ITSDI) vol. 1, No. Apr. 2, 2020, pp. 108-115.
Parliament, E. "Directive 95/46/EC of the European Parliament and of the Council of Oct. 24, 1995 on the protection of individuals with regard to the processing of personal data and on the free movement of such data." Official Journal of the European Communities, No. L 281, pp. 31-50, Oct. 24, 1995.
Anton Bankovskiy, "LinkedIn Blocked in Russia", Dec. 1, 2016, 3 pages. <https://seamless.legal/en/rus/publication/linkedin-blocked-in-russia>.
Determann et al, "Residency Requirements for Data in Clouds—What Now ?." 2015 by the Bureau of National Affairs, Inc., 5 pages.
Daley, M. James, Jason Priebe, and Patrick Zeller. "The Impact of Emerging Asia-Pacific Data Protection and Data Residency Requirements on Transnational Information Governance and Cross-Border Discovery." In Sedona Conf. J., vol. 16, year 2015, pp. 201-255.
Rao, K. Rajesh, and Ashalatha Nayak. "Data residency as a service: a secure mechanism for storing data in the cloud." International Journal of Embedded Systems 11, No. 4 (2019), pp. 397-418.
InCountry.com, 1 page, downloaded from the internet on Sep. 26, 2022, <https://incountry.com/>.
Iosup, Alexandru, Simon Ostermann, M. Nezih Yigitbasi, Radu Prodan, Thomas Fahringer, and Dick Epema. "Performance analysis of cloud computing services for many-tasks scientific computing." IEEE Transactions on Parallel and Distributed systems, vol. 22, No. 6, Jun. 2011, pp. 931-945.
Li, Ang, Xiaowei Yang, Srikanth Kandula, and Ming Zhang. "CloudCmp: comparing public cloud providers." In Proceedings of the 10th ACM SIGCOMM conference on Internet measurement, Nov. 1-3, 2010, pp. 1-14.
Liu, Zhenhua, Minghong Lin, Adam Wierman, Steven H. Low, and Lachlan LH Andrew. "Greening geographical load balancing." ACM SIGMETRICS' 11, Jun. 7-11, 2011, Performance Evaluation Review 39, No. 1 (2011): pp. 193-204.
Xu, Hong, and Baochun Li. "A general and practical datacenter selection framework for cloud services." In 2012 IEEE Fifth International Conference on Cloud Computing, pp. 9-16. IEEE, 2012.
Xu, Hong, and Baochun Li. "Cost efficient datacenter selection for cloud services." In 2012 1st IEEE International Conference on Communications in China (ICCC), pp. 51-56. IEEE, 2012.
Garg, Saurabh Kumar, Steve Versteeg, and Rajkumar Buyya. "A framework for ranking of cloud computing services." Future GenerationComputer Systems 29, No. 4, pp. 1012-1023, 2013.
Ur Rehman, Zia, Farookh K. Hussain, and Omar K. Hussain. "Towards multi-criteria cloud service selection." In 2011 Fifth International Conference on Innovative Mobile and Internet Services in Ubiquitous Computing, pp. 44-48. IEEE, 2011.
Whaiduzzaman, Md, Abdullah Gani, Nor Badrul Anuar, MuhammadShiraz, Mohammad Nazmul Haque, and Israat Tanzeena Haque. "Cloud service selection using multicriteria decision analysis." The Scientific World Journal, vol. 2014, Article ID 459375, 10 pages.
Wikipedia, "Multiple-criteria decision analysis", 16 pages. Downloaded from the Internet on Jun. 20, 2022.
Saaty, Roseanna W. "The analytic hierarchy process-what it is and how it is used." Mathematical modelling vol. 9, No. 3-5, pp. 161-176, 1987.
Kahraman, Cengiz, Ufuk Cebeci, and Ziya Ulukan, "Multi-criteria supplier selection using fuzzy AHP." Logistics information management, vol. 16, No. 6, 2003, pp. 382-394.
Ozdemir, Seda, and Gokhan Sahin. "Multi-criteria decision-makingin the location selection for a solar PV power plant using AHP." Measurement 129 (2018): 218-226.
Rao, Ravipudi Venkata, "Decision making in the manufacturing environment: using graph theory and fuzzy multiple attribute decision making methods; Chapter 3: Applications of Improved MADM Methods to the Decision Making Problems of Manufacturing Environment", Springer Science & Business Media, 2007, 95 pages.
N. Kushwaha, P. Roguski and B. W. Watson, "Up in the Air: Ensuring Government Data Sovereignty in the Cloud," 2020 12th International Conference on Cyber Conflict (CyCon), Estonia, 2020, pp. 43-61. doi:10.23919/CyCon49761.2020.9131718.
Hussain, A., Chun, J. and Khan, M., 2020. A novel framework towards viable cloud service selection as a service (cssaas) under a fuzzy environment. Future Generation Computer Systems, 104, pp. 74-91.
Pape, S., Paci, F., Jurjens, J. and Massacci, F., "Selecting a Secure Cloud Provider—An Empirical Study and Multi Criteria Approach", MDPI, Information, Published May 11, 2020, 27 pages.
M. Hu, J. Luo, Y. Wang and B. Veeravalli, "Practical Resource Provisioning and Caching with Dynamic Resilience for Cloud-Based Content Distribution Networks," IEEE Transactions on Parallel and Distributed Systems, vol. 25, No. 8, pp. 2169-2179, Aug. 2014, doi:10.1109/TPDS.2013.287.
Hourieh Khalajzadeh, Dong Yuan, Bing Bing Zhou, John Grundy, Yun Yang, "Cost effective dynamic data placement for efficient access of social networks", Journal of Parallel and Distributed Computing, vol. 141, 2020, pp. 82-98, ISSN 0743-7315, https://doi.org/10.1016/j.jpdc.2020.03.013.
Julien Kritter, Mathieu Br'evilliers, Julien Lepagnot, Lhassane Idoumghar, "On the optimal placement of cameras for surveillance and the underlying set cover problem",Applied Soft Computing,vol. 74,2019,pp. 133-153, ISSN 1568-4946, https://doi.org/10.1016/j.asoc.2018.10.025.
Kapil Singi et al., "Test Optimization from release insights: an analytical hierarchy approach", 2017 IEEE/ACM 3rd International Workshop on Rapid Continuous Software Engineering (RCoSE), pp. 16-19.

* cited by examiner

| COUNTRY WISE DATA RESIDENCY | DATA RESIDENCY RESTRICTIONS | WITHIN COUNTRY | OUTSIDE COUNTRY | | | MODEL | DESCRIPTION |
|---|---|---|---|---|---|---|---|
| | | | WITHIN CLUSTER | WITHIN REGION | WITHIN GEO | | |
| COUNTRY | CLEAR COPY REGULATED DATA STORAGE | Y | Y | Y | Y | NO | The regions which doesn't enforce any data residency restriction so regulated data can be stored and processed across the globe without restrictions. |
| | CLEAR COPY REGULATED DATA PROCESS | Y | Y | Y | Y | | |
| COUNTRY | CLEAR COPY REGULATED DATA STORAGE | Y (FIRST COPY) | Y | Y | Y | REPLICATED | A copy of regulated data must remain within boundaries for storage, wherein data flow for processing and replication of the data is allowed. e.g. Russia |
| | CLEAR COPY REGULATED DATA PROCESS | Y | Y | Y | Y | | |
| COUNTRY | CLEAR COPY REGULATED DATA STORAGE | Y | N | N | N | RESTRICTED | Regulated data must remain within boundaries for storage, but data flow is allowed only for processing and not for outside storage – original or copy. e.g. S Korea |
| | CLEAR COPY REGULATED DATA PROCESS | Y | Y | N | N | | |
| COUNTRY | CLEAR COPY REGULATED DATA STORAGE | Y | N | N | N | EU MODEL | The regions which enforce intra-boundary, i.e., regulated data storage and processing both inside the within cluster boundary e.g. EU/EEA. |
| | CLEAR COPY REGULATED DATA PROCESS | Y | N | N | N | | |
| COUNTRY | CLEAR COPY REGULATED DATA STORAGE | Y | N | N | N | REDACTED | Regulated data must remain within boundaries for storage and even data flow is not allowed outside boundaries for processing and storage. e.g. Saudi Arabia |
| | CLEAR COPY REGULATED DATA PROCESS | Y | N | N | N | | |

*FIG. 4*

Knowledge Model with Regulatory Info.

| Region | Country | Regulation | Data Residency Model |
|---|---|---|---|
| North America | USA | YES | No |
| North America | Canada | YES | No |
| European Union | Germany | YES | Cluster |
| European Union | France | YES | Cluster |
| Asia | Vietnam | YES | Restricted |
| MENA | Saudi Arabia | YES | Redacted |
| MENA | Russia | YES | Replicated |

*FIG. 15*

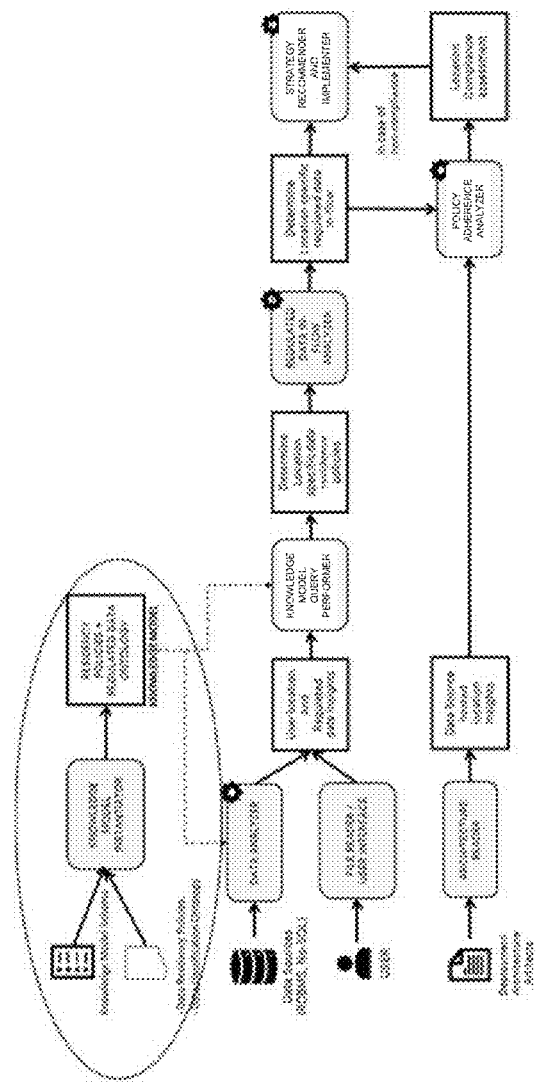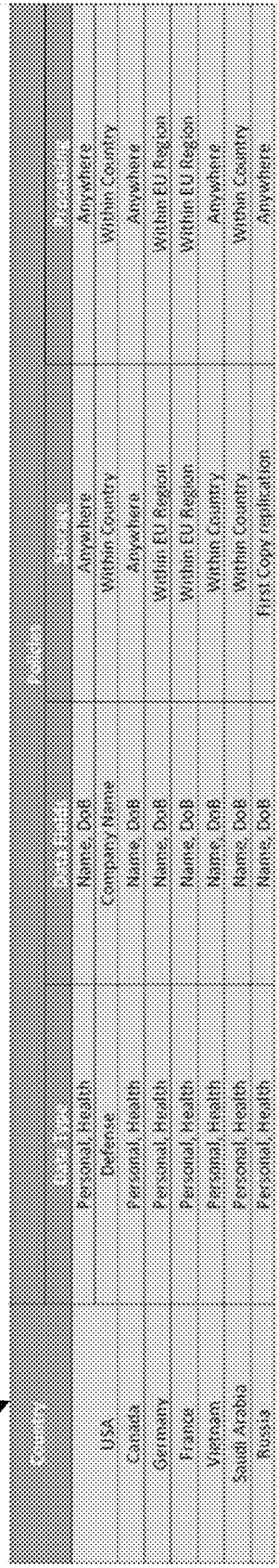
FIG. 16

```
GENERATE, BASED ON A KNOWLEDGE MODEL SCHEMA, DATA
RESIDENCY POLICIES, AND A DATA CLASSIFICATION ONTOLOGY, A
KNOWLEDGE MODEL THAT INCLUDES RESIDENCY POLICIES AND A
REGULATED DATA ONTOLOGY
3202
```
↓
```
ASCERTAIN, FOR AN APPLICATION, APPLICATION DATA
3204
```
↓
```
DETERMINE, BASED ON ANALYSIS OF THE APPLICATION DATA WITH
RESPECT TO THE KNOWLEDGE MODEL, WHETHER THE APPLICATION
INCLUDES REGULATED DATA
3206
```
↓
```
IMPLEMENT, BASED ON A DETERMINATION THAT THE APPLICATION
INCLUDES THE REGULATED DATA, RE-ARCHITECTING OF
APPLICATION ARCHITECTURE, OR HOSTING OF THE APPLICATION TO
A NEW HOSTING LOCATION
3208
```

FIG. 32

POLICY-BASED APPLICATION ARCHITECTURE GENERATION

PRIORITY

This application claims priority to commonly assigned and co-pending India Provisional Patent Application Serial No. 202111019975, filed Apr. 30, 2021, titled "POLICY-BASED APPLICATION ARCHITECTURE GENERATION", the disclosure of which is hereby incorporated by reference in its entirety.

BACKGROUND

A software application may be used by various users that are dispersed across multiple geographies. The application may be deployed and/or hosted within private, public, hybrid cloud, or entirely in an organization's data center. The architecture of such applications may need to comply with various policies associated with different geographic locations.

BRIEF DESCRIPTION OF DRAWINGS

Features of the present disclosure are illustrated by way of example and not limited in the following figure(s), in which like numerals indicate like elements, in which:

FIG. 4 illustrates data residency policies varieties and complexity to illustrate operation of the policy-based application architecture generation apparatus of FIG. 1 in accordance with an example of the present disclosure;

FIG. 15 illustrates a knowledge model with regulatory information to illustrate operation of the policy-based application architecture generation apparatus of FIG. 1 in accordance with an example of the present disclosure;

FIG. 16 illustrates a knowledge model instance snippet to illustrate operation of the policy-based application architecture generation apparatus of FIG. 1 in accordance with an example of the present disclosure;

FIG. 28 illustrates an existing application strategy recommended optimal architecture recommendation to illustrate operation of the policy-based application architecture generation apparatus of FIG. 1 in accordance with an example of the present disclosure;

FIG. 32 illustrates a flowchart of an example method for policy-based application architecture generation in accordance with an example of the present disclosure.

DETAILED DESCRIPTION

Figure 1:
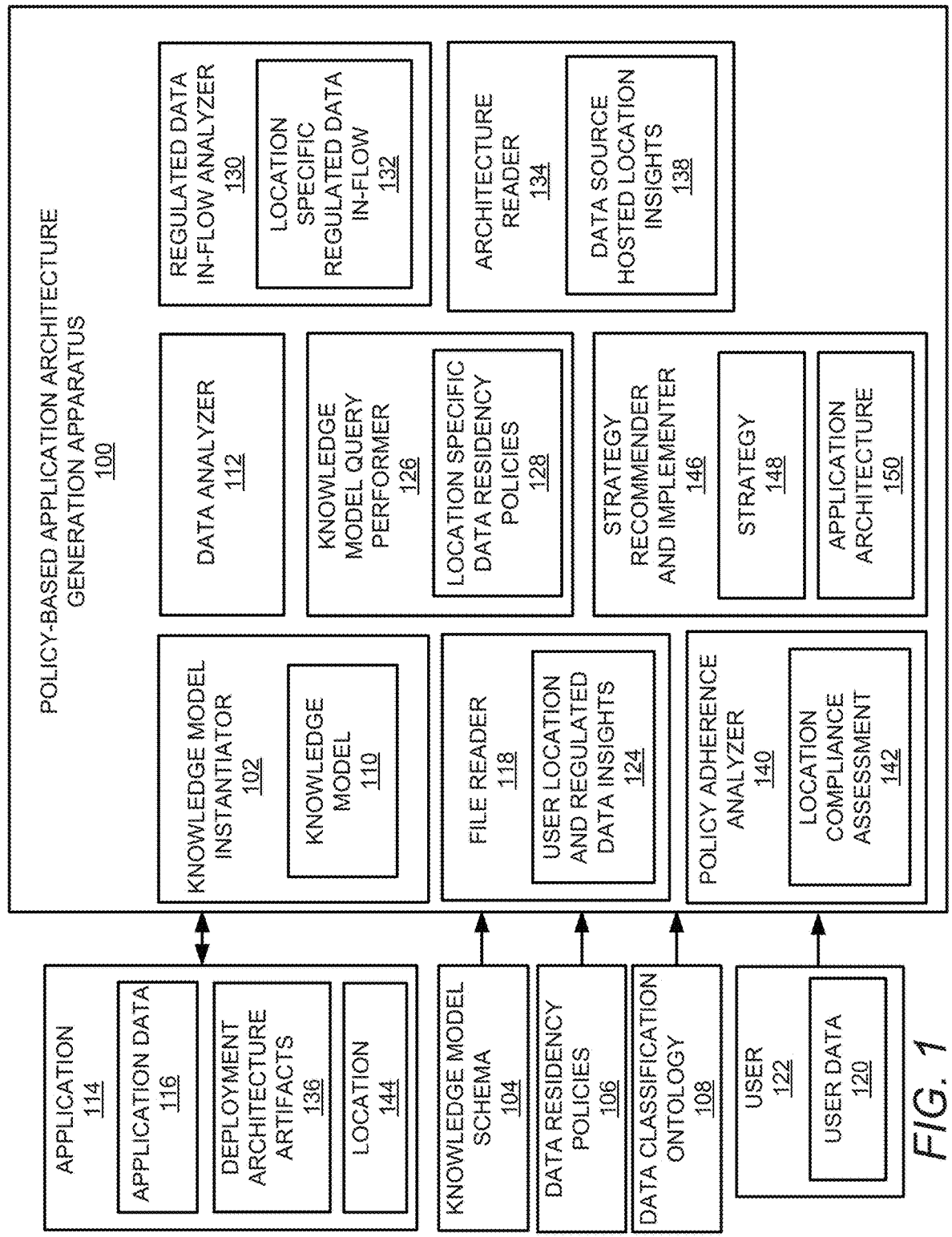
FIG. 1 illustrates a layout of a policy-based application architecture generation apparatus hi accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Policy-based application architecture generation apparatuses, methods for policy-based application architecture generation, and non-transitory computer readable media having stored thereon machine readable instructions to provide policy-based application architecture generation are disclosed herein. For example, the apparatuses, methods, and non-transitory computer readable media disclosed herein may provide for automated identification of policy-based application data in-flows, and assessment and determination of an optimal policy compliant deployment architecture. For a deployed application, the apparatuses, methods, and non-transitory computer readable media disclosed herein may assess policies and automatically (e.g., without human intervention) remediate the policies. The apparatuses, methods, and non-transitory computer readable media disclosed herein may provide for policy aware request processing, horizontal scaling and descaling of resources at user locations based on policies, performance of deployment architecture assessment, and automatic remediation for non-compliance. For a new application, the apparatuses, methods, and non-transitory computer readable media disclosed herein may generate a target deployment architecture that is compliant and optimal with respect to hosting locations based on various client inputs such as user locations, data volume, data type, applicable policies, etc.

With respect to the apparatuses, methods, and non-transitory computer readable media disclosed herein, data may represent a critical asset for organizations. Data may help an organization generate business insights, improve decision making, and create a competitive advantage. Typically, an organization may want exclusive control over data for their own advantage. To protect individual and national rights, governments may frame data residency regulations. These laws may govern the geographical constraints where storage, transmission and processing of data are allowed. Non-compliance to data regulations may often lead to serious repercussions for organizations, ranging from penalties to loss of brand value. The different variants of data residency constraints such as first copy within country storage may pose technical challenges in designing a regulation-compliant application deployment architecture.

Yet further, the rise of Internet and cloud computing technologies has helped enterprises cater to a large user-base across the globe. Enterprises deal with a large amount of non-regulated as well as regulated data. Enterprises generally prefer exclusive control over this valuable data as it helps them to stay ahead of the competition. Enterprises generally prefer to use cloud for storage as it provides access across borders, irrespective of the data store location. The rampant and non-regulated collection and usage of data as well as cross-border storage and processing has led to concerns on privacy, trust and ethics. This has resulted in several governments and organizations across geographies to frame data privacy and protection laws, to thereby safeguard the interests of their citizens.

Data laws may be focused on the idea that data is subject to the laws and governance structures of the data's originating territory. Data laws applicability may be restricted within jurisdiction boundary and may lose the law's protection once data moves outside the boundary, Therefore, laws enforce data residency constraints, which may restrict cross-border data flow movement, thereby enabling enforcement of the laws. Data residency regulations are specifically and uniquely designed for various locations. Staying updated in the continuous evolution of these laws has become technically challenging with respect to enforcement and adherence.

Yet further, an application software may be deployed based, for example, on business, technical and ecosystem aspects completely or partially missing out on the mandatory regulatory aspects. With continuously evolving regulations and enforcement of localization and residency policies by various governments across the globe, such factors may lead to application non-compliance and may result in penalties and impact brand value. The residency and localization policies may define the constraints imposed on the regulated data movement from one location to another for either storage or processing. Hence, there is a technical need to determine compliant and optimal deployment architecture based on these policies, iteratively assess an application against these policies for non-compliance, and generate a recommendation for compliant aware remedial measures. Thus, it is technically challenging to consider all such aspects to determine a compliant application architecture and strategy.

In order to deal with data law compliance, major cloud vendors may offer different types of services. These services may assist an organization with adherence to data protection and compliance, but with no or limited assistance in enforcing data residency.

Another technical challenge with enterprises is to evaluate a multitude of criteria such as scalability, data type, latency, etc., including data residency constraints, and determine a compliant application deployment architecture for diverse user locations.

The apparatuses, methods, and non-transitory computer readable media disclosed herein may address the aforementioned technical challenges by implementing a multi-criteria based compliant application architecture framework, which involves creation of a knowledge model with data residency laws and vendor characteristics, multi-criteria based cloud vendor and offering prioritization, determination of optimized location using set cover based on data residency constraints and application demographic aspects, and determination of an optimized compliant cloud application architecture.

The apparatuses, methods, and non-transitory computer readable media disclosed herein may further address the aforementioned technical challenges by implementing a framework and multi-criteria decision technique for determining an optimal single cloud or multi cloud architecture. The framework may be based on several criteria including permitted data flows as per regulations, data sensitivity and type, availability of cloud providers, etc. The framework may also help cloud architects to rapidly arrive at a set of deployment architecture options, which can be further optimized by architects.

The apparatuses, methods, and non-transitory computer readable media disclosed herein may yet further address the aforementioned technical challenges by instantiating a knowledge model. In this regard, data residency policy schemas may be defined as seen based on applicability across the globe. The knowledge model may be generated by first identifying, for example, by a subject matter expert (SME), various geo-location specific data residency policies that are applicable based, for example, on industry domain, data operation (e.g., storage, processing), and data type. The SME may further identify and create an ontology of various associated regulated data fields for the policies. Using the data residency policy schemas, the knowledge model may be instantiated.

Next, with respect to inputs for various use-case scenarios, for application architecture generation for new applications, a client may provide prospective user locations and intensity of regulated data involved for them. With respect to policy aware application re-architecture for deployed applications, data sources may be analyzed with respect to the regulated data fields to determine user location, user volume and regulated data volume. In this regard, a data analyzer may determine the following:

UserPercentage($X$)=UserVolume($X$)/Sum(UserVolume($X_1 \ldots X_N$)) where $X$ is location and $N$ is set of all locations, RegulatedData($X$)=RegulatedRecords($X$)/Sum(RegulatedRecords($X_1 \ldots X_N$)) where $X$ is location and $N$ is the set of all locations.

RegulatedDataIntensity($X$)=average(UserPercentage($X$),RegulatedData($X$)) where $X$ is location, Artifacts may be analyzed to determine deployment architecture tuples for storage and processing as follows:

Data_Storage_Tuple($X,Y$,List($Z$)), where $X$ is data source resource name, $Y$ is location where the resource is located, and $Z$ represents user locations whose data is stored in data source $X$.

Data_Process_Tuple($X,Y$,List($Z$)), where $X$ is process resource name, $Y$ is location where the resource is located, and $Z$ represents user locations whose data is processed by $X$.

Policy aware request processing may then be performed for the deployed application.

Next, data residency policies may be fetched from the knowledge model for application user locations. For each user location, regulated data in-flow aspects may be determined by a regulated data in-flow analyzer. A regulated data in-flow value from location 'Y' into location 'X' may be determined as follows:

InFlow_value($X,Y$)=RegulatedDataIntensity($Y$)*sum(operations_allowed($X,Y$))/total_number_of_operations;

A regulated data value in-flow to any location 'X' from all locations may be determined as follows:

InFlow_value($X$)=InFlow_value($X$,1)+ . . . +InFlow_value($X,N$) where 1 . . . $N$ are user locations.

For every location X, a list of countries whose regulated data in-flow is allowed for storage and processing may be maintained as follows:

Regulated_data_In-flow_StorageOperation($X$,StorageLocationsList($P$)) where $P$ locations data can be stored at location $X$.

Regulated_data_In-flow_ProcessOperation($X$,ProcessLocationsList($Q$)), where $Q$ locations data can be processed at location $X$.

For new architecture generation, a strategy recommender and implementer may generate an optimal compliant hosting strategy.

For application re-architecture, a policy adherence analyzer may analyze deployment insights and regulated data inflow results to perform regulated data in-flow compliance assessment for existing deployed locations. The policy adherence analyzer may bucketize locations into compliant hosted locations and non-compliant hosted locations. The policy adherence analyzer may then trigger a strategy recommender to determine alternate compliant locations for non-compliant locations as well as an optimal compliant hosting strategy for refinement of an existing architecture.

The strategy recommender and analyzer may determine a sub-set of hosting locations from a list for optimal and alternative scenarios as follows. First, the highest regulated data in-flow location from the list may be selected and placed into an optimal hosting list. The selected option may cover regulated data storage for X user locations and processing for Y user locations out of N user locations. The strategy recommender and implementer may determine another location from the N-X and N-Y locations list with highest regulated data inflow for covering unaddressed locations. This step may be performed until all locations regulated data storage and processing are covered.

An optimal hosting list may include minimalistic locations where an application can be hosted in a compliant manner, whereas a suggestive hosting list may contain alternate compliant hosting options.

Next, with respect to a use case analysis that includes a policy aware request processing for a deployed application, when a user request is received, the strategy recommender and implementer may send the compliant and non-compliant locations where the request can be stored or processed.

With respect to horizontal scaling, a load balancer may receive insights from the strategy recommender and implementer. In this regard, the load balancer may determine the hosted compliant location where the data request can be stored or processed. In case no compliant location exists, the load balancer may invoke horizontal scaling of the resource at the compliant location for request processing.

With respect to policy aware re-architecting, for existing architecture, in case of non-compliance, the load balancer may invoke horizontal scaling of resources at compliant locations and redirect further requests to make the architecture compliant.

According to examples disclosed herein, the apparatuses, methods, and non-transitory computer readable media disclosed herein may generate a recommendation for an optimum and compliant application deployment architecture blueprint adhering to data residency and localization policies based on client inputs and application analysis.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example policy-based application architecture generation apparatus (hereinafter also referred to as "apparatus 100").

Referring to FIG. 1, the apparatus 100 may include a knowledge model instantiator 102 that is executed by at least one hardware processor (e.g., the hardware processor 3102 of FIG. 31, and/or the hardware processor 3304 of FIG. 33) to generate, based on a knowledge model schema 104, data residency policies 106, and a data classification ontology 108, a knowledge model 110 that includes residency policies and a regulated data ontology.

A data analyzer 112 that is executed by at least one hardware processor (e.g., the hardware processor 3102 of FIG. 31, and/or the hardware processor 3304 of FIG. 33) may ascertain, for an application 114, application data 116. The data analyzer 112 may determine, based on analysis of the application data 116 with respect to the knowledge model 110, whether the application 114 includes regulated data.

According to examples disclosed herein, the data analyzer 112 may determine the regulated data for the location associated with the application 114 relative to regulated data for a plurality of locations.

According to examples disclosed herein, the data analyzer 112 may determine a total number of unique users for the location associated with the application 114 relative to a total numbers of users across all locations.

According to examples disclosed herein, the data analyzer 112 may determine a user percentage as a function of a user data for the location associated with the application 114 relative to user data for all locations. The data analyzer 112 may determine the regulated data as a function of regulated records for the location associated with the application 114 relative to regulated records for all locations. Further, the data analyzer 112 may determine a regulated data intensity as a function of the user percentage and the regulated data.

A file reader 118 that is executed by at least one hardware processor (e.g., the hardware processor 3102 of FIG. 31, and/or the hardware processor 3304 of FIG. 33) may obtain user data 120 for a user 122 associated with the application 114. The data analyzer 112 and the file reader 118 may generate, based on an analysis of the application data 116 and the user data 120, user location and regulated data insights 124.

A knowledge model query performer 126 that is executed by at least one hardware processor (e.g., the hardware processor 3102 of FIG. 31, and/or the hardware processor 3304 of FIG. 33) may query, based on the user location and regulated data insights 124, the knowledge model 110. The knowledge model query performer 126 may determine, based on the query of the knowledge model 110, location specific data residency policies 128.

A regulated data in-flow analyzer 130 that is executed by at least one hardware processor (e.g., the hardware processor 3102 of FIG. 31, and/or the hardware processor 3304 of FIG. 33) may determine, based on an analysis of the location specific data residency policies 106, location specific regulated data in-flow 132.

According to examples disclosed herein, the regulated data in-flow analyzer 130 may determine, based on the analysis of the location specific data residency policies, location specific regulated data in-flow 132 by determining a regulated data in-flow value as a function of a regulated data intensity, and a sum of operations allowed relative to a total number of operations.

According to examples disclosed herein, the regulated data in-flow analyzer 130 may determine, based on the regulated data in-flow value, a processing datacenter for processing the application data by identifying the processing datacenter including the highest regulated data in-flow value.

An architecture reader 134 that is executed by at least one hardware processor (e.g., the hardware processor 3102 of FIG. 31, and/or the hardware processor 3304 of FIG. 33) may generate, based on an analysis of deployment architecture artifacts 136 for the application 114, data source hosted location insights 138.

A policy adherence analyzer 140 that is executed by at least one hardware processor (e.g., the hardware processor 3102 of FIG. 31, and/or the hardware processor 3304 of FIG. 33) may determine, based on an analysis of the location specific regulated data in-flow 132 and the data source hosted location insights 138, a location compliance assessment 142. The location compliance assessment 142 may include an indication of whether a location 144 associated with the application 114 is compliant or not compliant with the location specific data residency policies 106.

A strategy recommender and implementer 146 that is executed by at least one hardware processor (e.g., the hardware processor 3102 of FIG. 31, and/or the hardware processor 3304 of FIG. 33) may generate, based on a determination that the location 144 associated with the application 114 is not compliant with the location specific data residency policies 106, a strategy 148 for compliance of application architecture 150 for the application 114 with the location specific data residency policies 106. The strategy recommender and implementer 146 may implement, based on the strategy 148, re-architecting of the application architecture 150. Alternatively, the strategy recommender and implementer 146 may implement, based on the strategy 148, generation of a new architecture with respect to the application architecture 150.

Figure 2:
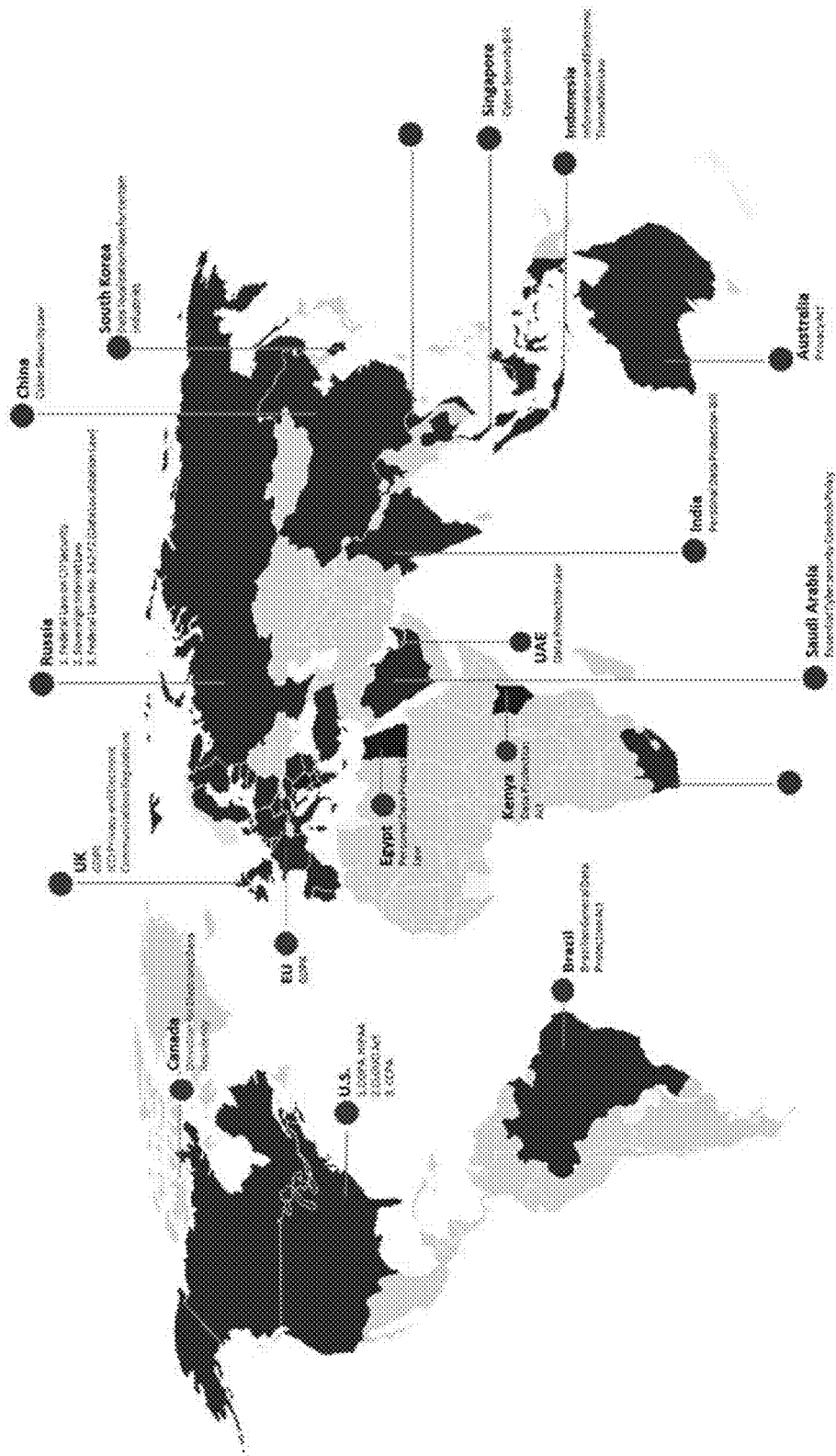
FIG. 2 illustrates data protection laws to illustrate operation of the policy-based application architecture generation apparatus of FIG. 1 in accordance with an example of the present disclosure.

According to examples disclosed herein, the strategy recommender and implementer 146 may generate, based on the location compliance assessment, an optimum architecture for the application 114 by performing location prioritization for deployment, FIG. 2 illustrates data protection laws to illustrate operation of the apparatus 100 in accordance with an example of the present disclosure.

Referring to FIG. 2, data protection laws may specify regulations and policies for data storage, transmission, and processing. The data protection laws may protect users' rights with respect to personal data, and other such data. Further, non-compliance may lead, for example, to monetary penalties, loss of reputation, and erosion of trust.

Figure 3:
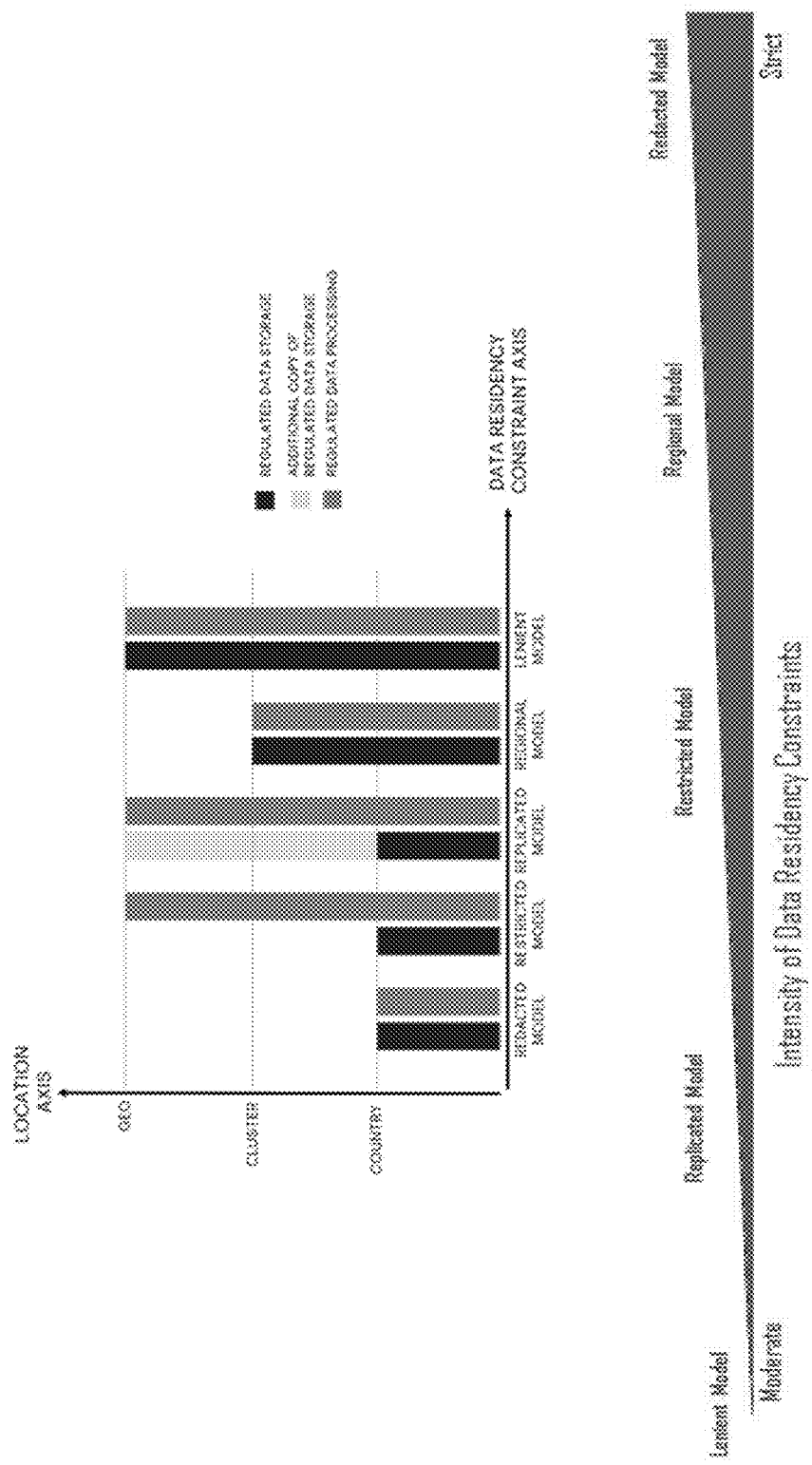
FIG. 3 illustrates how data localization and residency requirements impose constraints on data and application architecture to illustrate operation of the policy-based application architecture generation apparatus of FIG. 1 in accordance with an example of the present disclosure.

FIG. 3 illustrates how data localization and residency requirements impose constraints on data and application architecture to illustrate operation of the apparatus 100 in accordance with an example of the present disclosure.

Referring to FIG. 3, data residency and data localization may include subtle nuances, Data Localization may require that data created within certain borders stay within them, either required by law or due to restrictive policies. Further, realization of these data localization laws may occur through the enforcement of data residency requirements for an enterprise or business or personal data information of an identifiable individual. While some countries enact blanket bans on data transfers within country or cluster boundary, other countries may enforce storage first copy or complete data constraint. For example, with respect to data localization laws in some countries, fines for first time offences for legal entities may be imposed, and in other cases other sanctions such as an entity being blocked may be imposed.

FIG. 4 illustrates data residency policies varieties and complexity to illustrate operation of the apparatus 100 in accordance with an example of the present disclosure.

Referring to FIG. 4, as shown, different countries may include different data residency policies with different complexities associated therewith.

Figure 5:
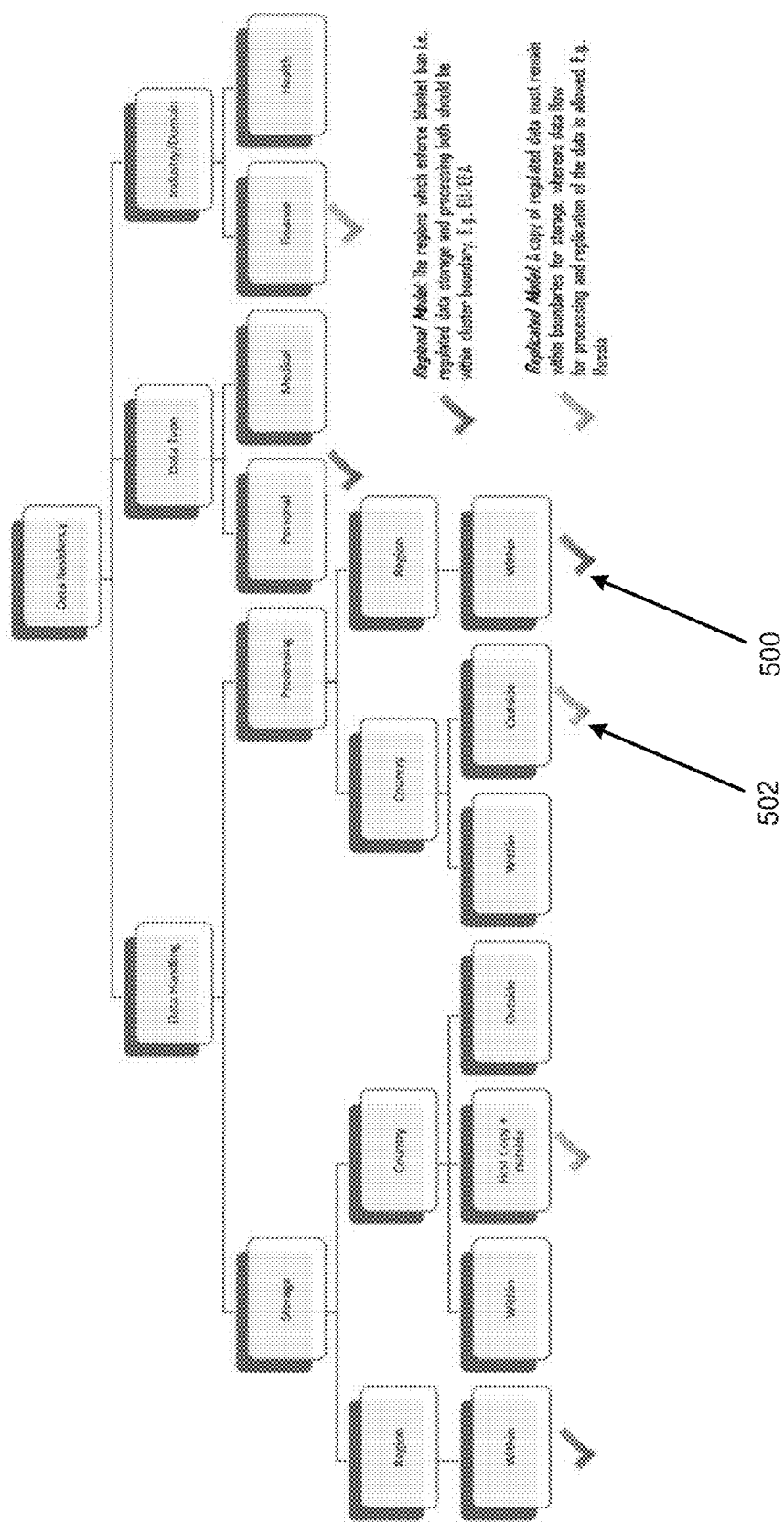
FIG. 5 illustrates regulation complexity modelling to illustrate operation of the policy-based application architecture generation apparatus of FIG. 1 in accordance with an example of the present disclosure.

FIG. 5 illustrates regulation complexity modelling to illustrate operation of the apparatus 100 in accordance with an example of the present disclosure.

Referring to FIG. 5, with respect to the regional model, the regions which enforce a blanket ban are shown at 500 (e.g., regulated data storage and processing both should be within cluster boundary, such as for European Union (EU) and European Economic Area (EEA)). Further, with respect to the replicated model, a copy of regulated data must remain within boundaries for storage, whereas data flow for processing and replication of the data is allowed (e.g., in Russia (RU)).

Figure 6:
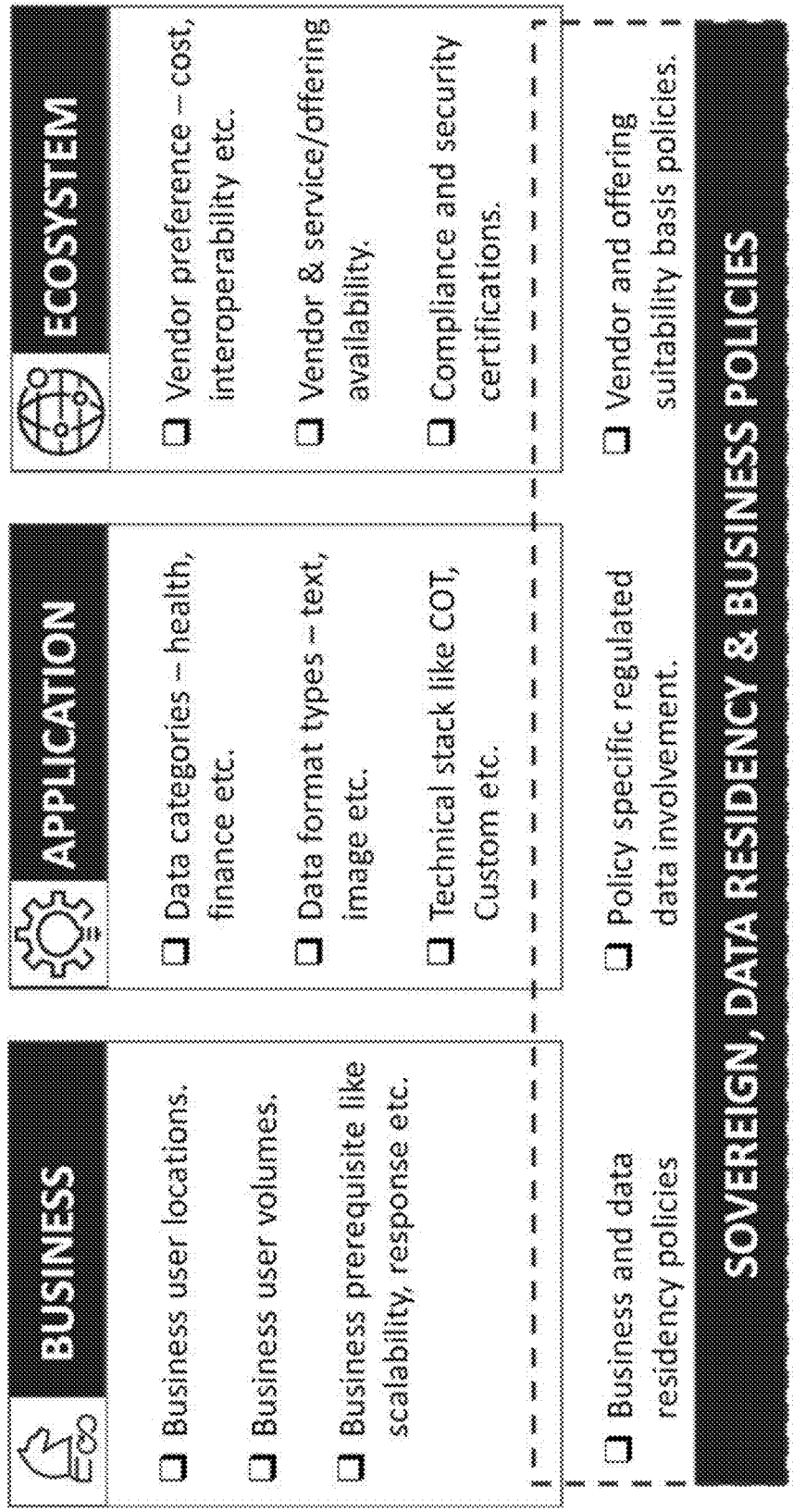
FIG. 6 illustrates policy aware application architecture to illustrate operation of the policy-based application architecture generation apparatus of FIG. 1 in accordance with an example of the present disclosure.

FIG. 6 illustrates policy aware application architecture to illustrate operation of the apparatus 100 in accordance with an example of the present disclosure.

Referring to FIG. 6, the policy aware application architecture may account for various policies such as business and data residency policies, policy specific regulated data involvement, vendor and offering suitability basis policies, etc.

Figure 7:
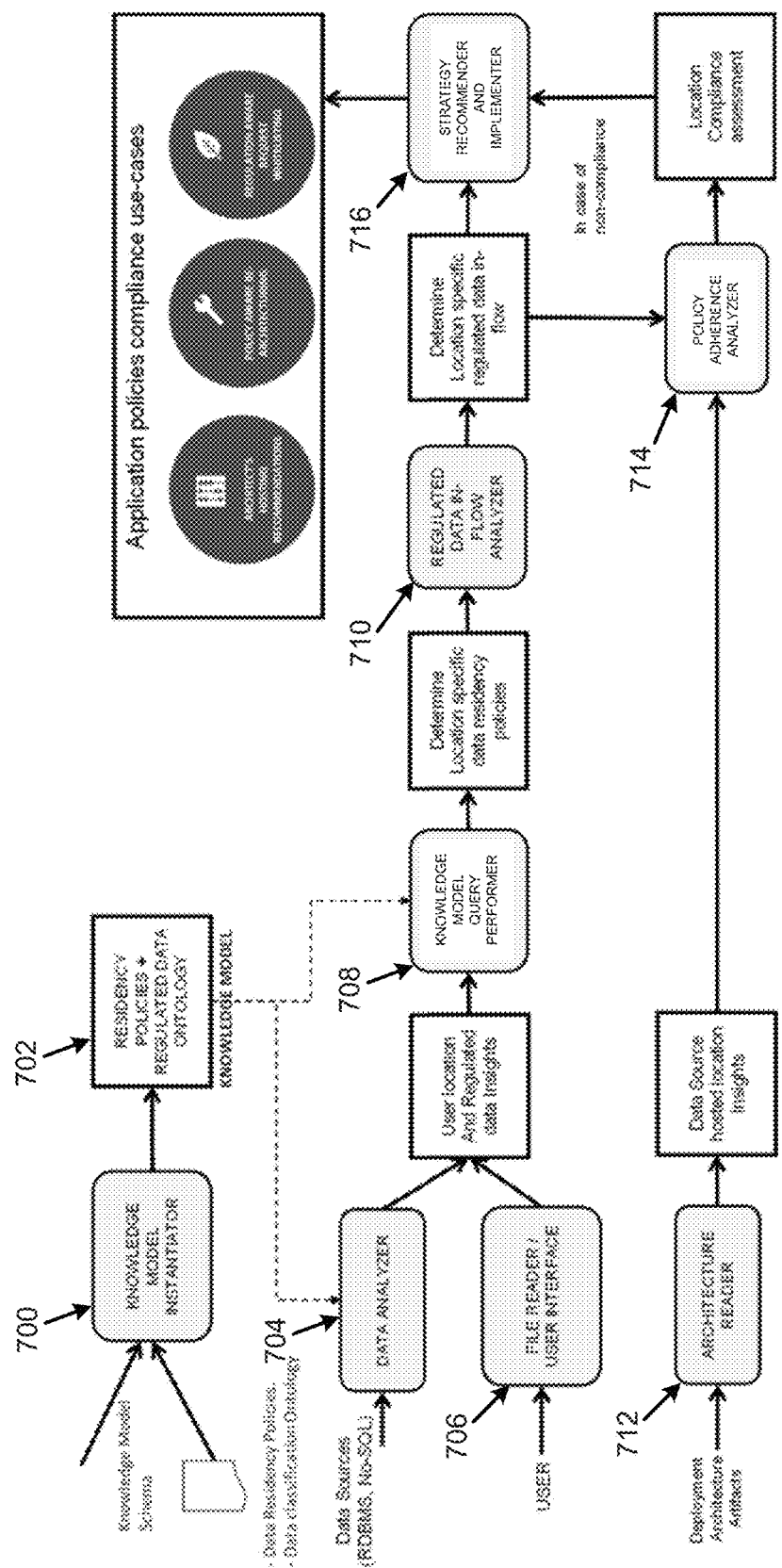
FIG. 7 illustrates a logical flow of the policy-based application architecture generation apparatus of FIG. 1 in accordance with an example of the present disclosure.

FIG. 7 illustrates a logical flow of the apparatus 100 in accordance with an example of the present disclosure.

Referring to FIG. 7, at block 700, the knowledge model instantiator 102 may ascertain a knowledge model schema 104, data residency policies 106 and a data classification ontology 108 to generate, at block 702, a knowledge model 110. The knowledge model 110 may include residency policies and a regulated data ontology.

For the application 114 that may include a deployed application, at block 704, the data analyzer 112 may ascertain application data 116 from data sources. The data analyzer 112 may analyze the application data 116 with respect to the knowledge model 110 to determine whether the application 114 includes regulated data.

At block 706, a file reader 118 may obtain user data 120 for a user 122 associated with the application 114. The data analyzer 112 and the file reader 118 may generate, based on an analysis of the application data 116 from data sources and the user data 120 fora user 122 associated with the application 114, user location and regulated data insights 124.

At block 708, the user location and regulated data insights 124 may be used by the knowledge model query performer 126 to query the knowledge model 110. The knowledge model query performer 126 may determine, based on the query of the knowledge model 110, location specific data residency policies 106.

At block 710, the regulated data in-flow analyzer 130 may determine, based on an analysis of the location specific data residency policies 106, location specific regulated data in-flow 132 (e.g., where the regulated data can be processed).

At block 712, the architecture reader 134 may analyze deployment architecture artifacts 136 to generate data source hosted location insights 138.

At block 714, the policy adherence analyzer 140 may determine, based on an analysis of the location specific regulated data in-flow 132 and the data source hosted location insights 138, the location compliance assessment 142. In this regard, the policy adherence analyzer 140 may determine whether the location is compliant or not compliant with the location specific data residency policies 106.

At block 716, based on a determination that the location compliance assessment 142 is not compliant with the location specific data residency policies 106, the strategy recommender and implementer 146 may generate, based on the location compliance assessment 142 and the location specific regulated data in-flow 132, a strategy 148 for compliance of the application architecture 150 for the application 114 with the location specific data residency policies 106. In this regard, the strategy recommender and implementer 146 may implement, based on the strategy 148, re-architecting of the application architecture 150 for the application 114.

For a new application, the flow of blocks 704-716 may be implemented as described above, except that inputs for blocks 704, 706, and 708 may be received with respect to the new application, instead of for the deployed application.

Figure 8:
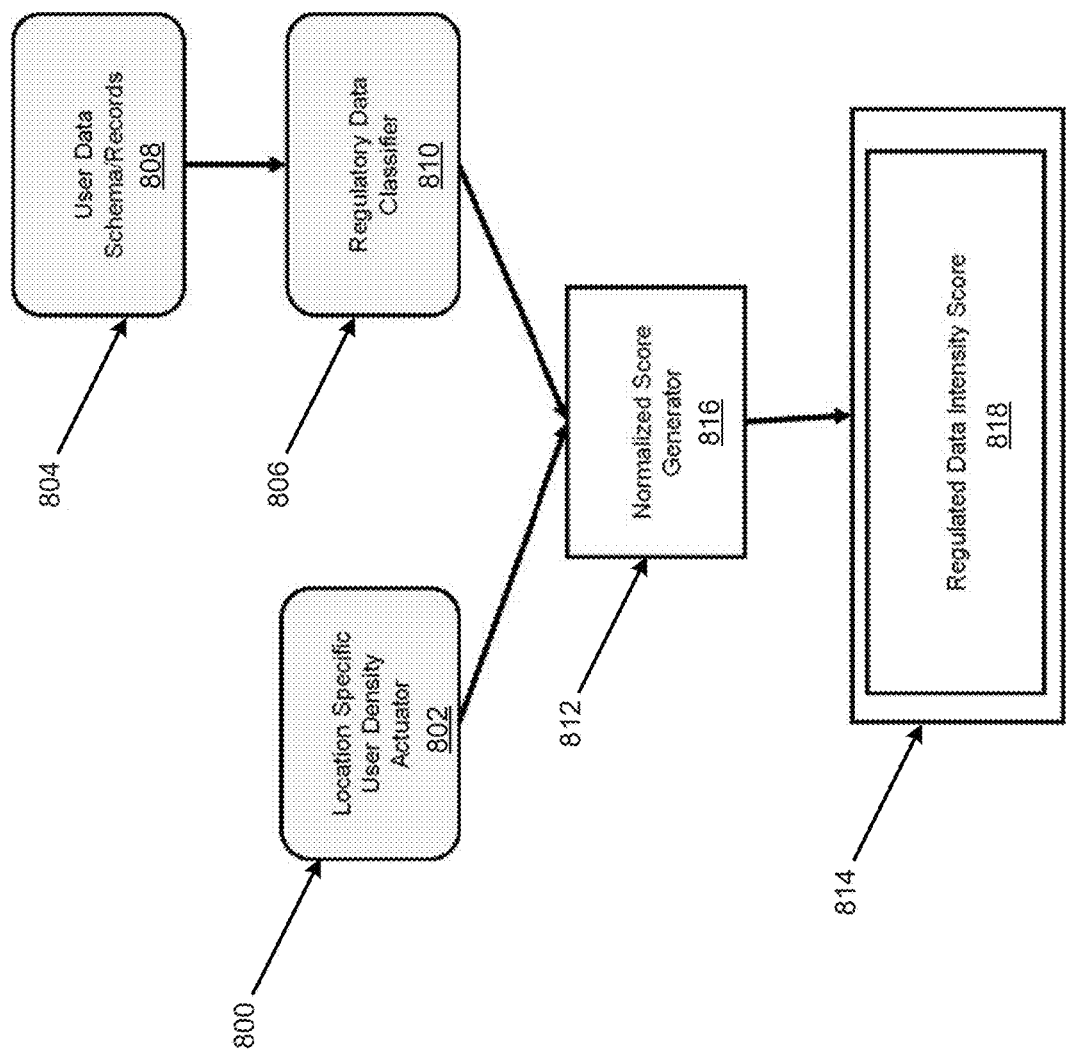
FIG. 8 illustrates a logical flow of a data analyzer of the policy-based application architecture generation apparatus of FIG. 1 in accordance with an example of the present disclosure.

FIG. 8 illustrates a logical flow of the data analyzer 112 of the apparatus 100 in accordance with an example of the present disclosure.

Referring to FIG. 8, with respect to the data analyzer 112, at block 800, a location specific user density actuator 802 of the data analyzer 112 may determine user percentage as follows:

$$UserPercentage(Y) = \frac{UserVolume(Y)}{\sum_{y \in N} UserVolume(y)} * 100$$

In this regard, UserVolume represents volume of user data (e.g., total number of records from the users in that location) which is designated as Y, and N may denote a set of all user locations. At blocks 804 and 806, user data schema and records 808 may be received by a regulatory data classifier 810 of the data analyzer 112 and analyzed as follows:

$$RegulatedData(Y) = \frac{RegulatedRecords(Y)}{\sum_{y \in N} RegulatedRecords(y)} * 100$$

Regulated records may represent records that have been marked as sensitive information based on the regulation and policies. For example, as per the GDPR policy, any personal data (e.g., information that can be used to identify a person) such as name, personal identification, etc., is considered as Personally Identification Information (PII) or sensitive data. At blocks 812 and 814, a normalized score generator 816 of the data analyzer 112 may generate a regulated data intensity score 818 as follows:

$$RegulatedDataIntensity(Y) = \overline{UserPerercentage(Y) + RegulatedData(Y)}$$

Figure 9:
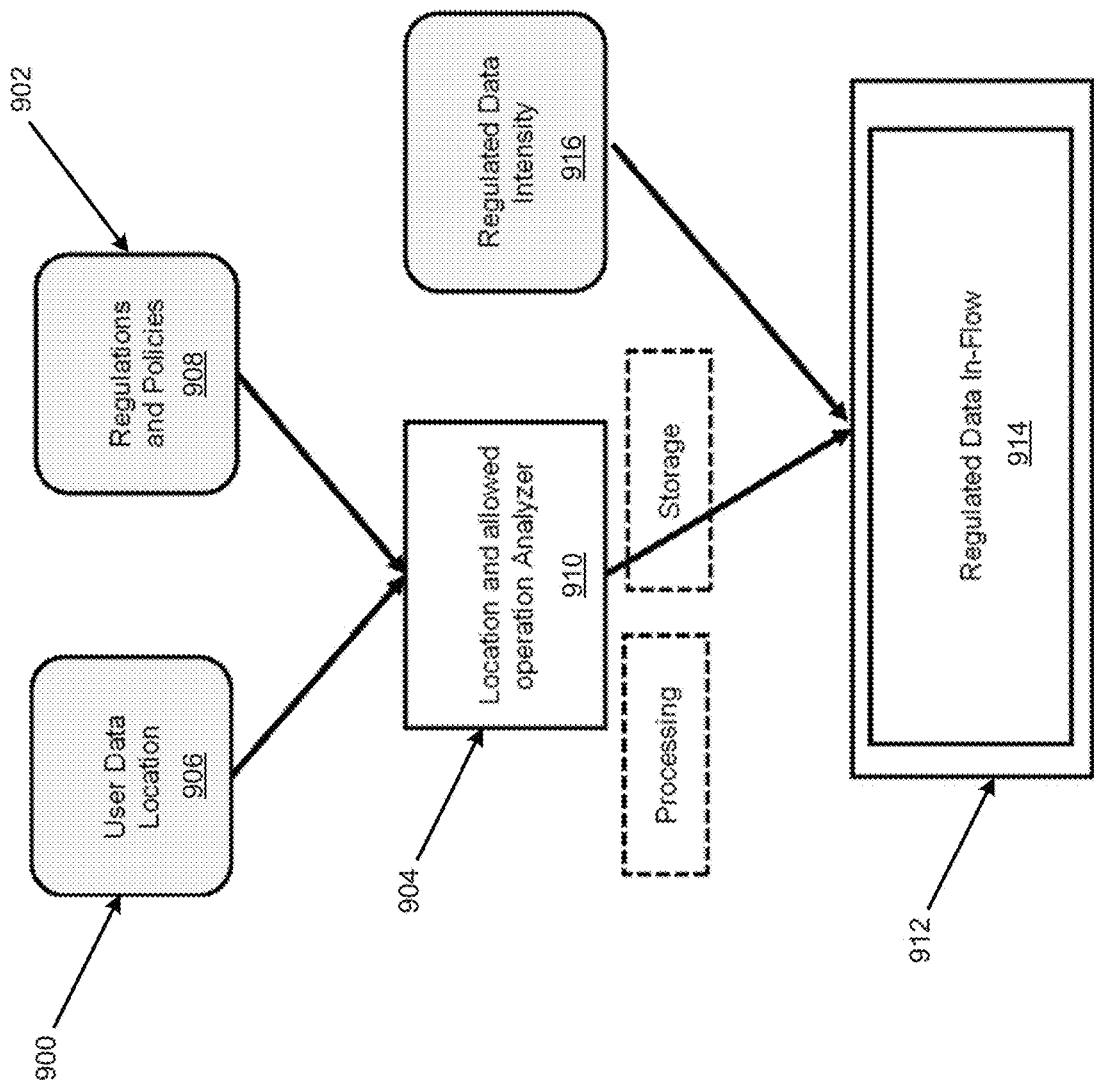
FIG. 9 illustrates a regulated data in-flow analyzer of the policy-based application architecture generation apparatus of FIG. 1 in accordance with an example of the present disclosure.

FIG. 9 illustrates the regulated data in-flow analyzer 130 of the apparatus 100 in accordance with an example of the present disclosure.

Referring to FIG. 9, with respect to blocks 900, 902, and 904, user data location 906, and regulations and policies 908 may be received by a location and allowed operation analyzer 910 of the regulated data in-flow analyzer 130, and analyzed as follows:

$$InFlow(X, Y) = RegulatedDataIntensity(Y) * \frac{\sum_{p \in M} Operation\ (p, X)}{|M|}$$

In this regard, the location and allowed operation analyzer 910 may analyze the in-flow into user location X from Y, where p may represent the allowed operation as X, from the set of all possible operations M. The location and allowed operation analyzer 910 may further perform the following operation:

$$InFlow(X,Y) = InFlow(X,Y,p \in P) + InFlow(X,Y,p \in Q)$$

In this regard, the location and allowed operation analyzer 910 may analyze the inflow into user location X from Y, where p may represent be allowed operation as X, operation "storage" Q and "processing" P, With respect to block 912, regulated data in-flow 914 may be performed based on regulated data intensity 916 and determined as follows $$Regulated\ Data\ InFlow(X) = \sum_{Y \in N} InFlow(X, Y)$$

In this regard, user location may be designated as Y, and N may denote a set of user locations.

Figure 10:
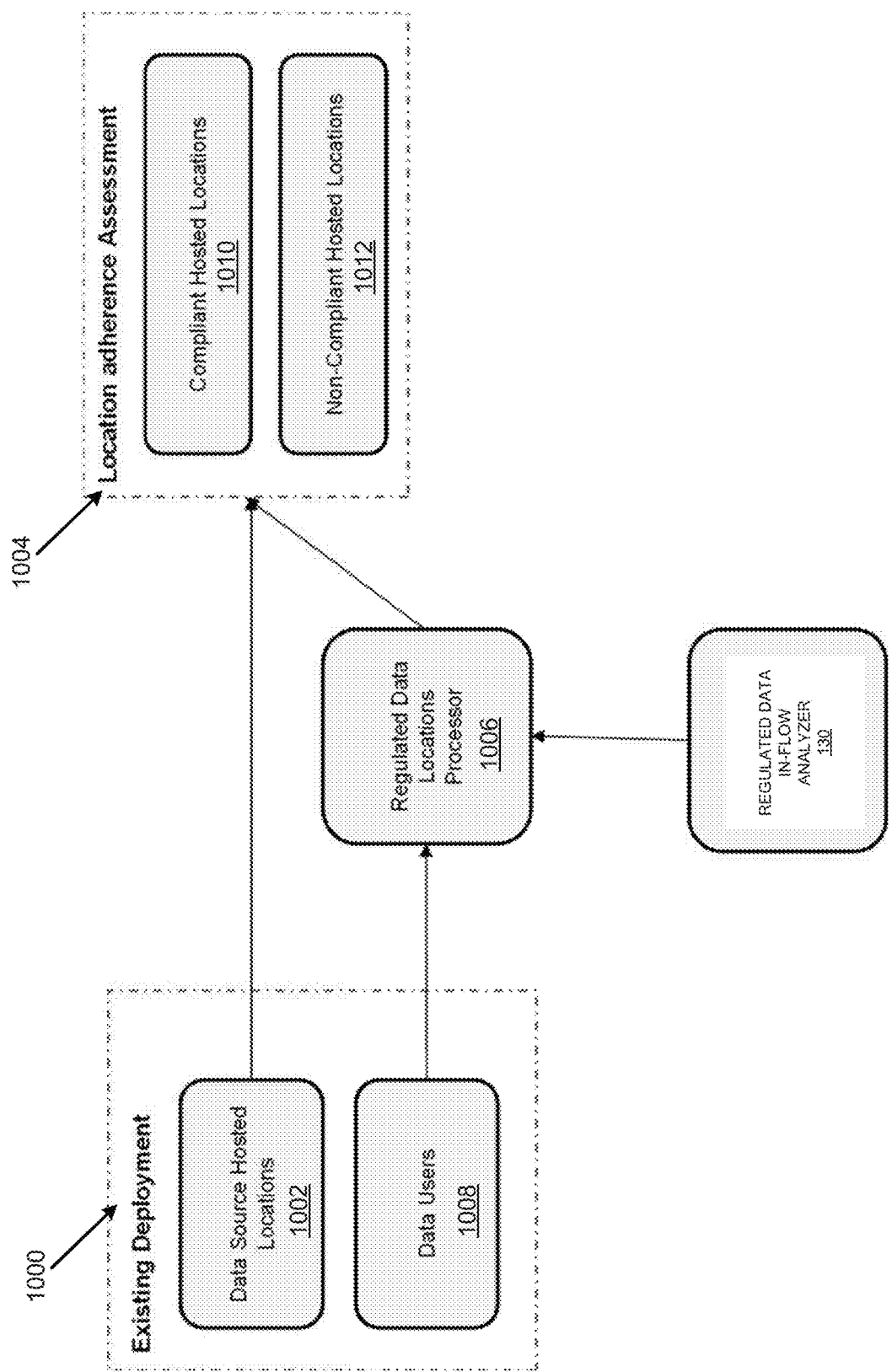
FIG. 10 illustrates a policy adherence analyzer of the policy-based application architecture generation apparatus of FIG. 1 in accordance with an example of the present disclosure.

FIG. 10 illustrates a policy adherence analyzer 140 of the apparatus 100 in accordance with an example of the present disclosure.

Referring to FIG. 10, with respect to existing deployment at 1000, data source hosted locations 1002 may be forwarded for location adherence assessment at 1004. A regulated data locations processor 1006 of the policy adherence analyzer 140 may receive information related to data users 1008 and information from the regulated data in-flow analyzer 130, and forward results of the analysis to the location adherence assessment at 1004 (e.g., denoted "location compliance assessment" in FIG. 7). At the location adherence assessment at 1004, compliance hosted locations 1010 and non-compliant hosted locations 1012 may be determined.

Figure 11:
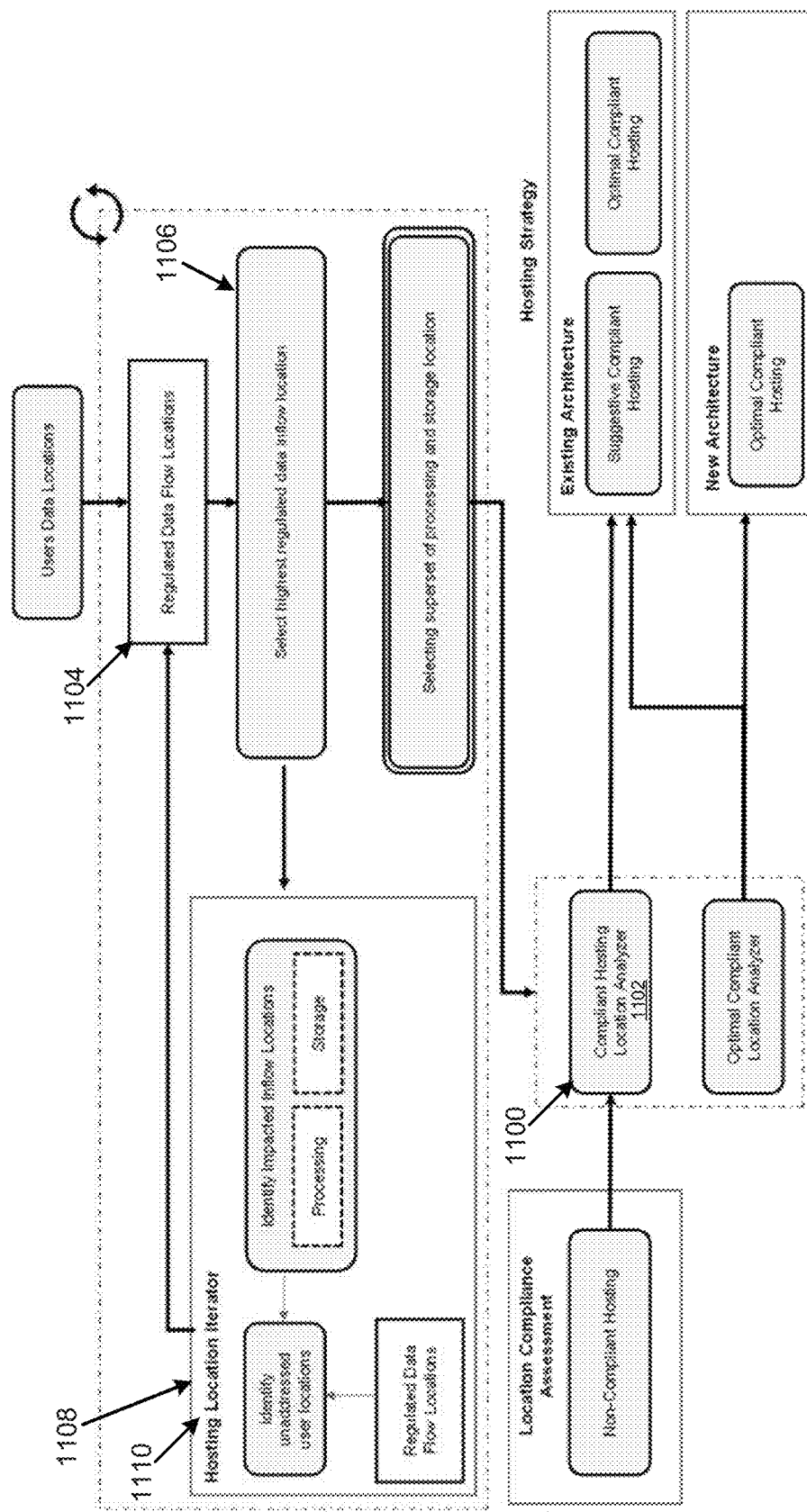
FIG. 11 illustrates a strategy recommender and implementer of the policy-based application architecture generation apparatus of FIG. 1 in accordance with an example of the present disclosure.

FIG. 11 illustrates a strategy recommender and implementer 146 of the apparatus 100 in accordance with an example of the present disclosure.

Referring to FIG. 11, at block 1100, a compliant hosting location analyzer 1102 of the strategy recommender and implementer 146 may also generate, based on the location compliance assessment (see also FIG. 7) that identifies non-compliant hosting locations, an optimum architecture by determining regulated data in-flow, performing location prioritization for deployment, determining single or multiple location cloud offering deployment, and determining data residency offering deployment with data flow architecture. Along with regulated data in-flow, user spread percentage and cloud vendor and offering score within location may be used as other criteria to prioritize deployment location using a multi-criteria assessor.

At block 1104, from the regulated data flow locations, a highest regulated data in-flow location may be selected at 1106.

At block 1108, based on the highest regulated data in-flow location, the hosting location iterator 1110 may determine which countries/locations the highest regulated data in-flow location is addressing. Thus out of a specified number of locations, a reduced number of optimal locations may be determined for hosting an application.

Figure 12:
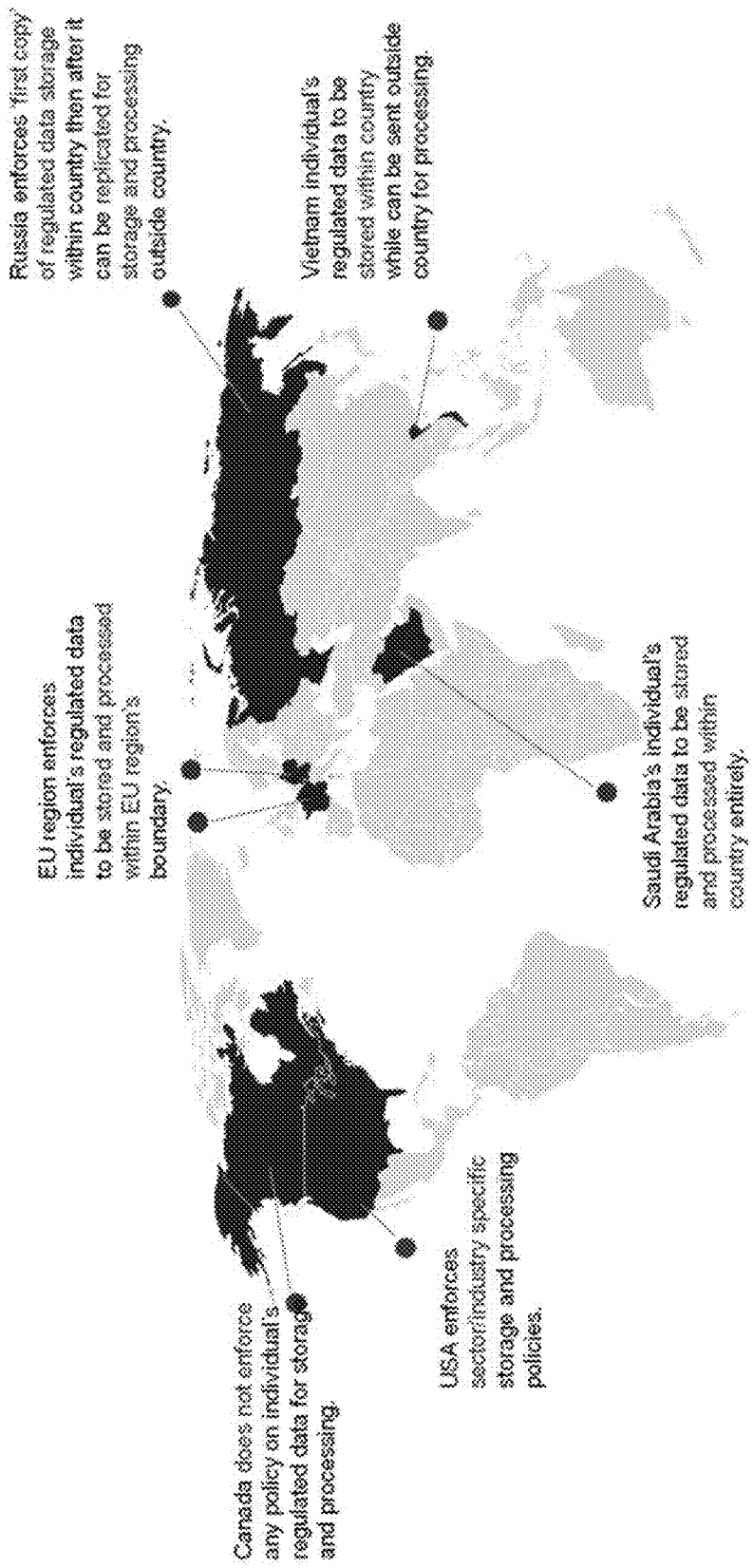
FIG. 12 illustrates policy distribution to illustrate operation of the policy-based application architecture generation apparatus of FIG. 1 in accordance with an example of the present disclosure.

FIG. 12 illustrates policy distribution to illustrate operation of the apparatus 100 in accordance with an example of the present disclosure.

Referring to FIG. 12, the different countries and regions may include different types of models (e.g., 'Restricted Model', 'Replicated Model', 'Redacted Model', etc.).

Figure 13:
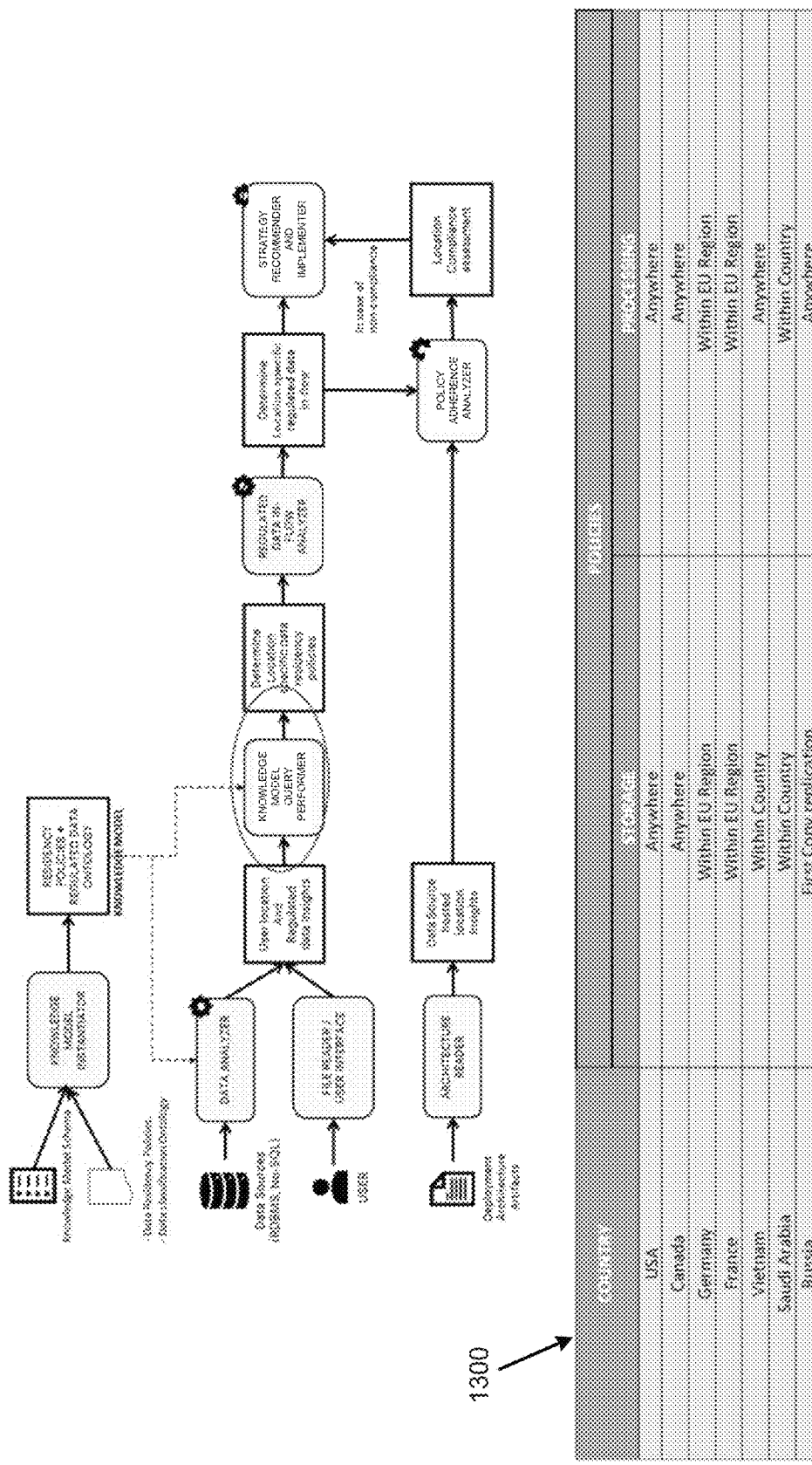
FIG. 13 illustrates an existing application knowledge model query to illustrate operation of the policy-based application architecture generation apparatus of FIG. 1 in accordance with an example of the present disclosure.

FIG. 13 illustrates an existing application knowledge model query to illustrate operation of the apparatus 100 in accordance with an example of the present disclosure.

Referring to FIG. 13, the existing application may represent a deployed application as disclosed herein. Countries and associated policies with respect to storage and processing are illustrated at 1300.

Figure 14:
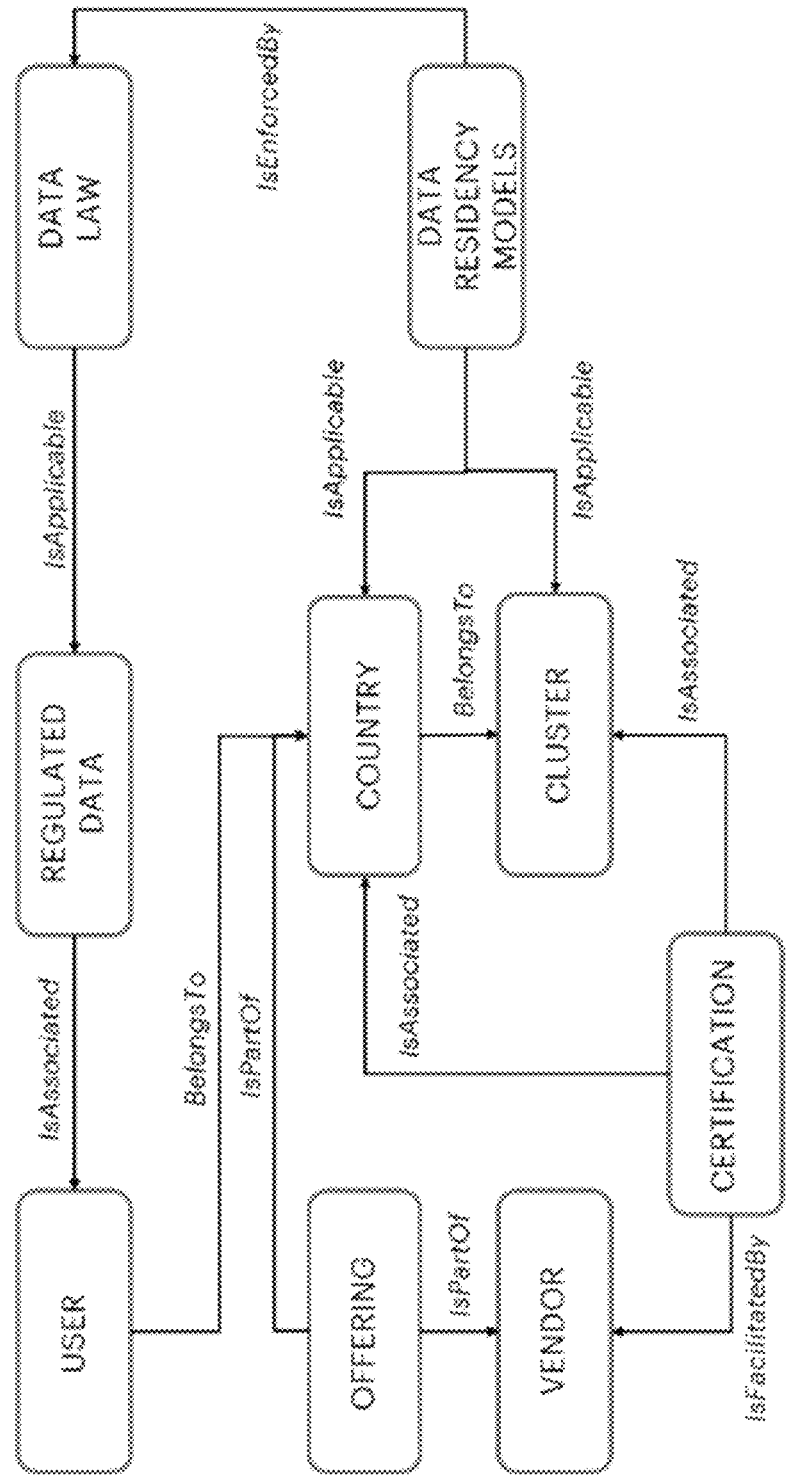
FIG. 14 illustrates a knowledge model schema to illustrate operation of the policy-based application architecture generation apparatus of FIG. 1 in accordance with an example of the present disclosure.

FIG. 14 illustrates a knowledge model schema to illustrate operation of the apparatus 100 in accordance with an example of the present disclosure.

Referring to FIG. 14, the knowledge model 110 may represent a multi-relational graph composed of entities (captured as nodes) and relations (captured as edges). The applicability of data laws may be based on the nature and type of regulated data that is associated with an individual and enforced data residency constraint. An individual may belong to a country and/or region which is part of a cluster, Cloud or data residency vendors may render an offering within a country and help facilitate an application with the security and compliance certifications, With respect to the knowledge model schema of FIG. 14, the knowledge model instantiator 102 may extract data residency constraints from distributed and heterogeneous regulatory data sources, and capture cloud and data residency vendor characteristics, for example, through REST application programming interfaces (API) calls. The extracted laws, their associated data residency constraints, and vendor aspects may then be mapped to the knowledge model schema. For example, Germany being a part of the EU cluster, may need to adhere to their data privacy and protection law 'GDPR', which may be applicable to an individual's personal data and enforces data residency constraints under a cluster model. The knowledge model may be instantiated with cloud vendors (e.g., ABC, DEF, and GHI, and a single data residency vendor JKL), and cloud offerings. In the case of region specific non-standard laws, a knowledge graph may be updated with the variability of laws, or client specification may be considered for the data residency model classification. The knowledge model may be periodically updated with respect to the latest laws and vendors to determine a best-fit alternative from various alternatives.

FIG. 15 illustrates a knowledge model with regulatory information to illustrate operation of the apparatus 100 in accordance with an example of the present disclosure.

FIG. 15 shows queried regulatory output from the instantiated knowledge model for a clinical trial application. All countries have data regulations but have different data residency constraints. For example, the countries 'USA' and 'Canada' fall under 'No Model' due to no specific residency constraint, whereas 'Germany' and 'France' may follow the 'Cluster Model' due to data flow restrictions within the European Union (EU). 'Vietnam' may allow data flow for processing but restrict storage within the country e.g., 'Restricted Model'. 'Russia' may fall under the 'Replicated Model' due to first copy storage constraint, whereas 'Saudi Arabia' may follow 'Redacted Model' due to the blanket ban on data flow outside boundary.

FIG. 16 illustrates a knowledge model instance snippet 1600 to illustrate operation of the apparatus 100 in accordance with an example of the present disclosure.

Referring to FIG. 16, the knowledge model instance snippet 1600 may include information related to countries, and associated policies. For the policies, the information may include data type, data fields, storage, and processing. For example, 'personal' data type includes data fields such as 'name', 'date of birth', etc., may have no restriction with respect to storage and processing for the United States location, whereas the same data type and data fields may have 'within region' storage and processing constraints for the Germany location.

Figure 17:
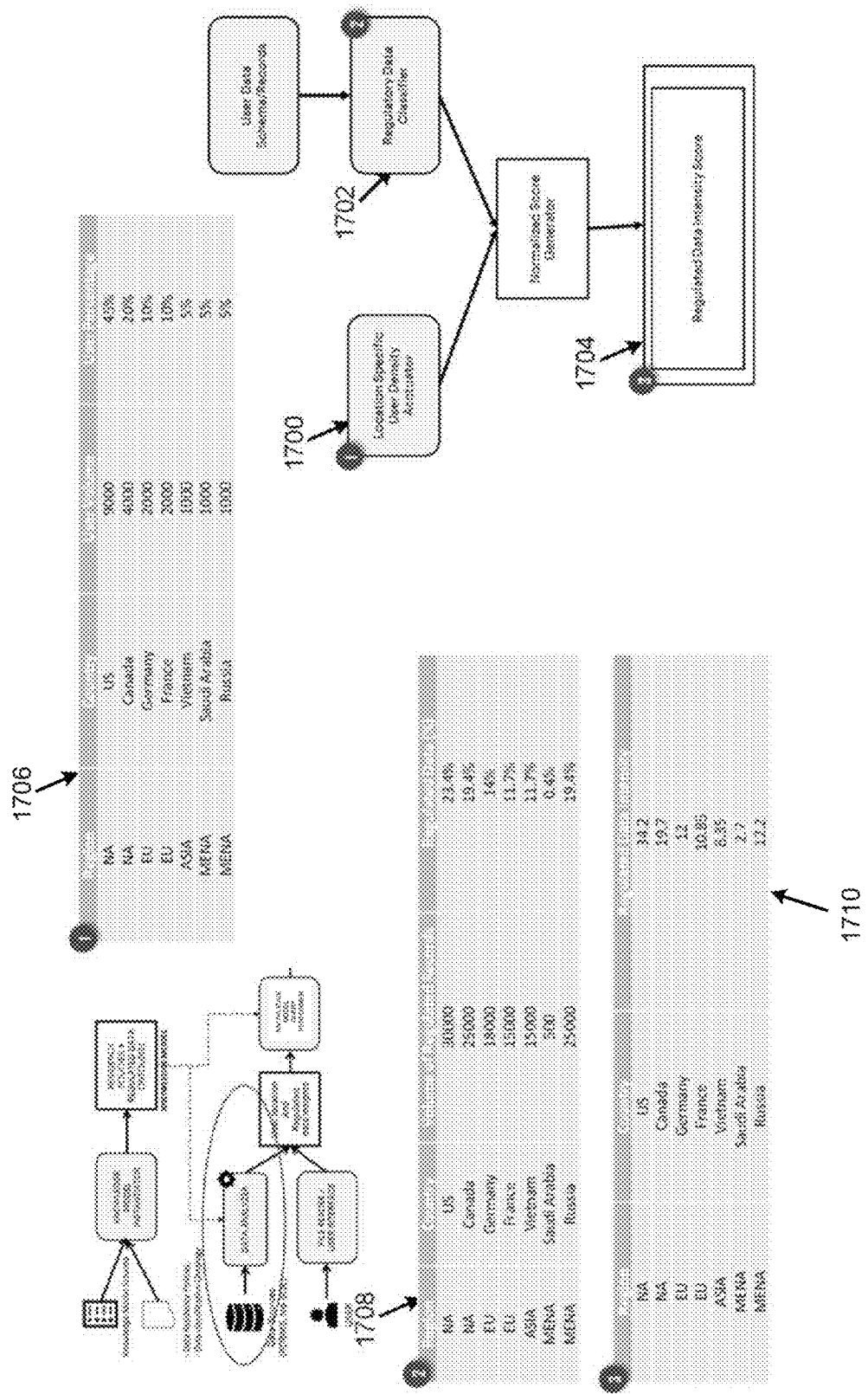
FIG. 17 illustrates an existing application data source analysis to illustrate operation of the policy-based application architecture generation apparatus of FIG. 1 in accordance with an example of the present disclosure.

FIG. 17 illustrates an existing application data source analysis to illustrate operation of the apparatus 100 in accordance with an example of the present disclosure.

Referring to FIG. 17, results of processing by a location specific user density actuator at block 1700 and a regulatory data classifier at block 1702, and regulated data intensity score at block 1704 are illustrated at 1706, 1708, and 1710, respectively. As shown at 1710, regulated data intensity scores for countries such as the United States, Canada, Germany, France, Vietnam, Saudi Arabia, and Russia, are respectively shown as 34.2, 19.7, 12, 10.85, 8.35, 2.7, and 12.2.

The data analyzer 112 may recognize the attributes that identify user as well as location from the data source, Thereafter the uniqueness of the user location attributes (e.g., IP-Address, country, etc.) may be asserted to determine all of the user's location. The data analyzer 112 may analyze the concentration of regulated data intensity within location. This value may be used to determine the inflow of regulated data in a country.

In order to determine each location's user percentage (e.g., at 1706), the data analyzer 112 may query and determine a total number of unique users for location, and divide by the total number of unique users across all locations. For example, application has 9000 US users and UserPercentage (US) may be determined as (9000/(9000+4000+2000+2000+1000+1000+1000))*100=45%. Next, the data analyzer 112 may determine for each location regulated data percentage (e.g., at 1708), by determining basis volume of regulated records for location against the total number of regulated records within the application. For example, application has 30000 regulated records for US users against the total number of 30000+25000+18000+15000+15000+500+25000=128500 regulated records, Hence, RegulatedData (US)=30000/128500*100=23.4%.

Regulated data intensity may represent the average of UserPercentage value and the RegulatedData for the location. For the US, regulated data intensity may be determined as (23.4+45)/2=34.2. Regulated Data intensity may depict the concentration of the regulated data in a location, FIG. 18 illustrates an existing application regulated data in-flow analyzer to illustrate operation of the apparatus 100 in accordance with an example of the present disclosure.

Figure 18:
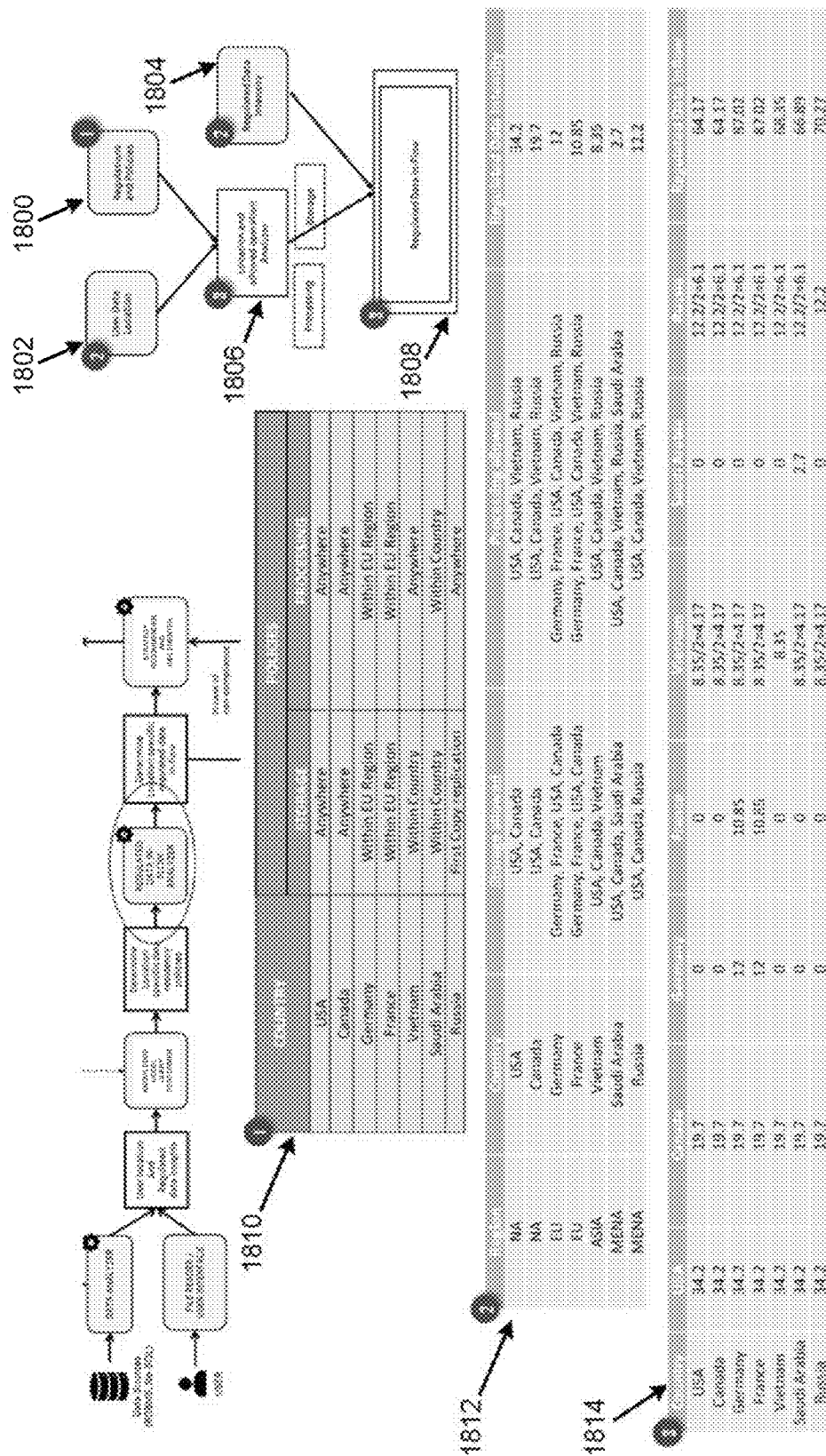
FIG. 18 illustrates an existing application regulated data in-flow analyzer to illustrate operation of the policy-based application architecture generation apparatus of FIG. 1 in accordance with an example of the present disclosure.

Referring to FIG. 18, regulations and policies 1800, user data location 1802 and regulated data intensity 1804, results of processing by a location and allowed operation analyzer at block 1806 and regulated data in-flow 1808 are illustrated at 1810, 1812, and 1814, respectively. As shown at 1812, regulated data intensity scores for countries such as the United States, Canada, Germany, France, Vietnam, Saudi Arabia, and Russia, are respectively shown as 34.2, 19.7, 12, 10.85, 8.35, 2.7, and 12.2. Based on these regulated data intensity scores, regulated data inflow values may be determined as 64.17, 64.17, 87.02, 87.02, 68.35, 66.85, and 70.27.

The knowledge model may be composed with regulations across various countries and regions related to various data types and Industry. Based on the restriction imposed by various regulations of a country, the data residency rules of a country pertaining to storage, processing, and transfer of data across the border of a country or a region may be classified.

With respect to the table at 1810, based on the regulations on the data flow provided by the government for that country, the data outflow provisioning may be classified for storage and processing. This information may be used to understand the location with the highest inflow along with the data intensity of that location.

With respect to the table at 1812, regulated data intensity value may be determined at 1710 and the policies may be determined at 1810. Storage allowed and processing allowed may depict the countries/region that allow storage and processing hi that country respectively.

With respect to the table at 1814, based on the number of operations, e.g., storage and processing allowed in that country, the inflow may be determined. For example, for country US, the countries that allow storage US are US, Canada and for processing US, Canada, Vietnam and Russia can send their data.

With respect to FIG. 7, regulated data Inflow value may be used to determine the most promising location for hosting storage and/or processing datacenters. The higher the data inflow value, the more likely a datacenter will be hosted there.

Figure 19:
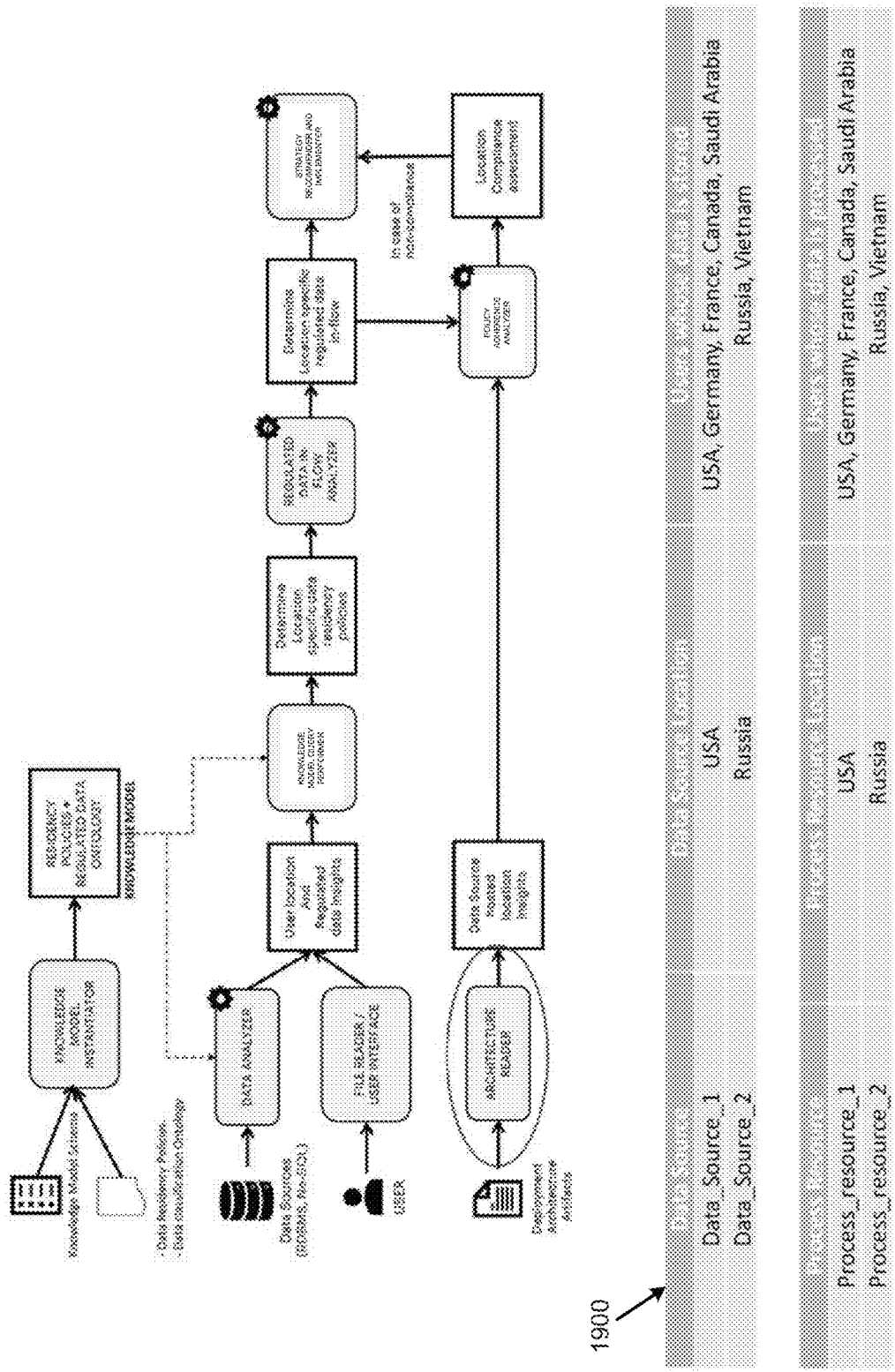
FIG. 19 illustrates an architecture reader to illustrate operation of the policy-based application architecture generation apparatus of FIG. 1 in accordance with an example of the present disclosure.

FIG. 19 illustrates the architecture reader 134 to illustrate operation of the apparatus 100 in accordance with an example of the present disclosure.

Referring to FIG. 19, with respect to the architecture reader 134, details related to deployment architecture artifacts 136 may include data source, data source location, users whose data is stored, process resource, process resource location, and users whose data is processed may be specified as shown at 1900. With respect to the table at 1900 the data may be collected either from the Configuration Management Database (CMDB) maintained by an organization or by means of surveys from the application owner. The data center hosting architecture may then be fed into the policy adherence analyzer 140 to determine the compliant and non-compliant locations based on regulations and policies provided for storage and processing of regulated data.

Figure 20:
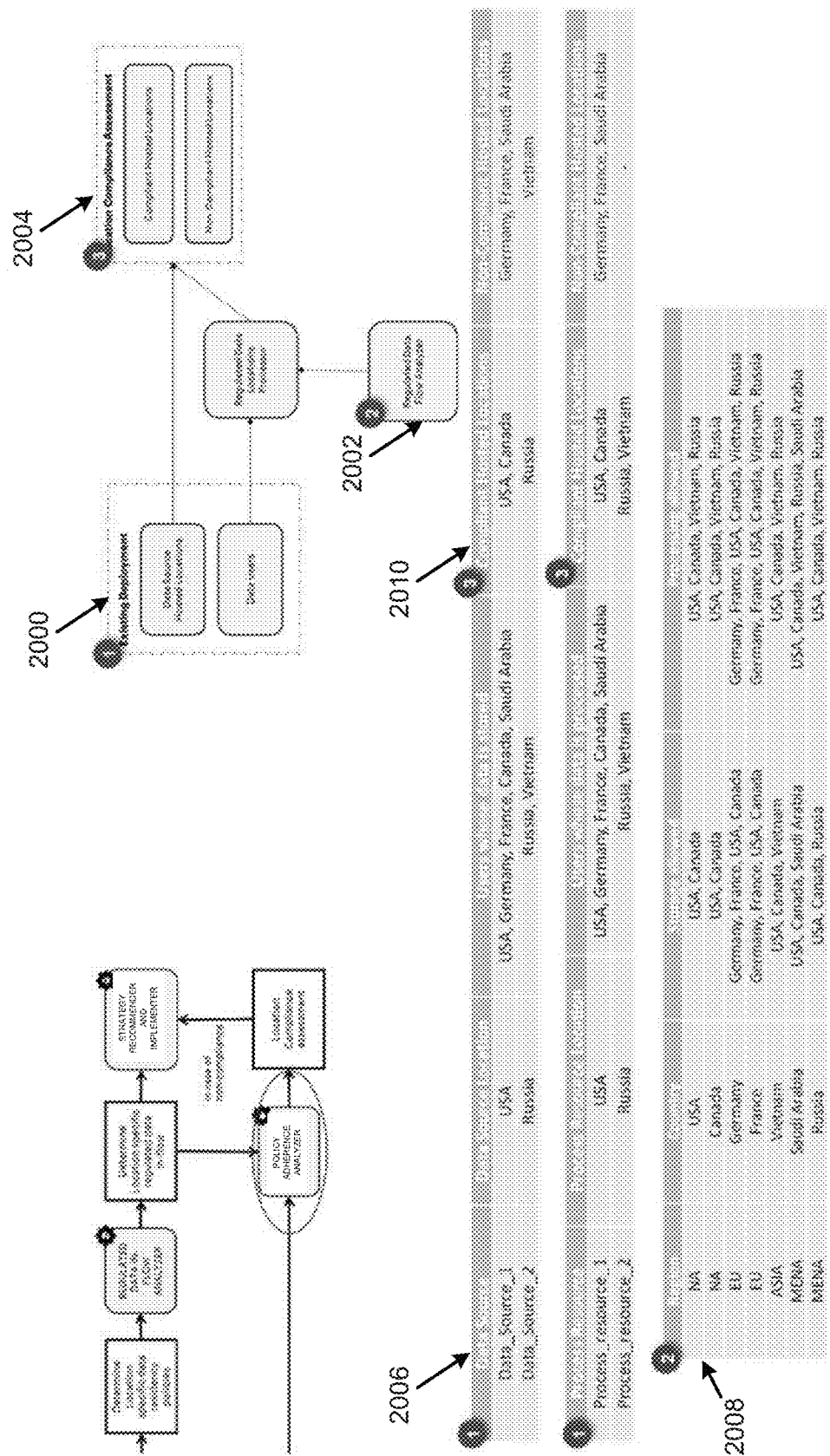
FIG. 20 illustrates an existing application policy adherence assessment to illustrate operation of the policy-based application architecture generation apparatus of FIG. 1 in accordance with an example of the present disclosure.

FIG. 20 illustrates an existing application policy adherence assessment to illustrate operation of the apparatus 100 in accordance with an example of the present disclosure.

Referring to FIG. 20, data source hosted locations 2000, results of processing by the regulated data in-flow analyzer 130 at 2002, and the location compliance assessment at 2004 are illustrated at 2006, 2008, and 2010, respectively.

The knowledge model 110 may define various types of regulatory models such as lenient, restricted, replicated, redacted and regional. Each country may be mapped to a regulatory model. Once the input data source is analyzed, the user locations stored therein may be determined. Thereafter, based on the regulatory models of user locations, a determination may be made as to whether storage/processing within the hosting locations is allowed.

The architecture reader 134 may determine the storage and processing hosting locations along with the information on whose data is stored/processed in that location. Based on the regulations provided at 2008, the compliant and non-compliant hosting locations may be determined. For example, for storage location US, only a user's data of locations US and Canada are allowed, whereas other countries user's regulated data (e.g., Saudi Arabia, Vietnam etc.) storage in the US is non-permitted.

Based on the non-compliant locations, the strategy recommender and implementer 145 may provide alternate hosting locations that can be deployed to make the already existing architecture compliant.

Figure 21:
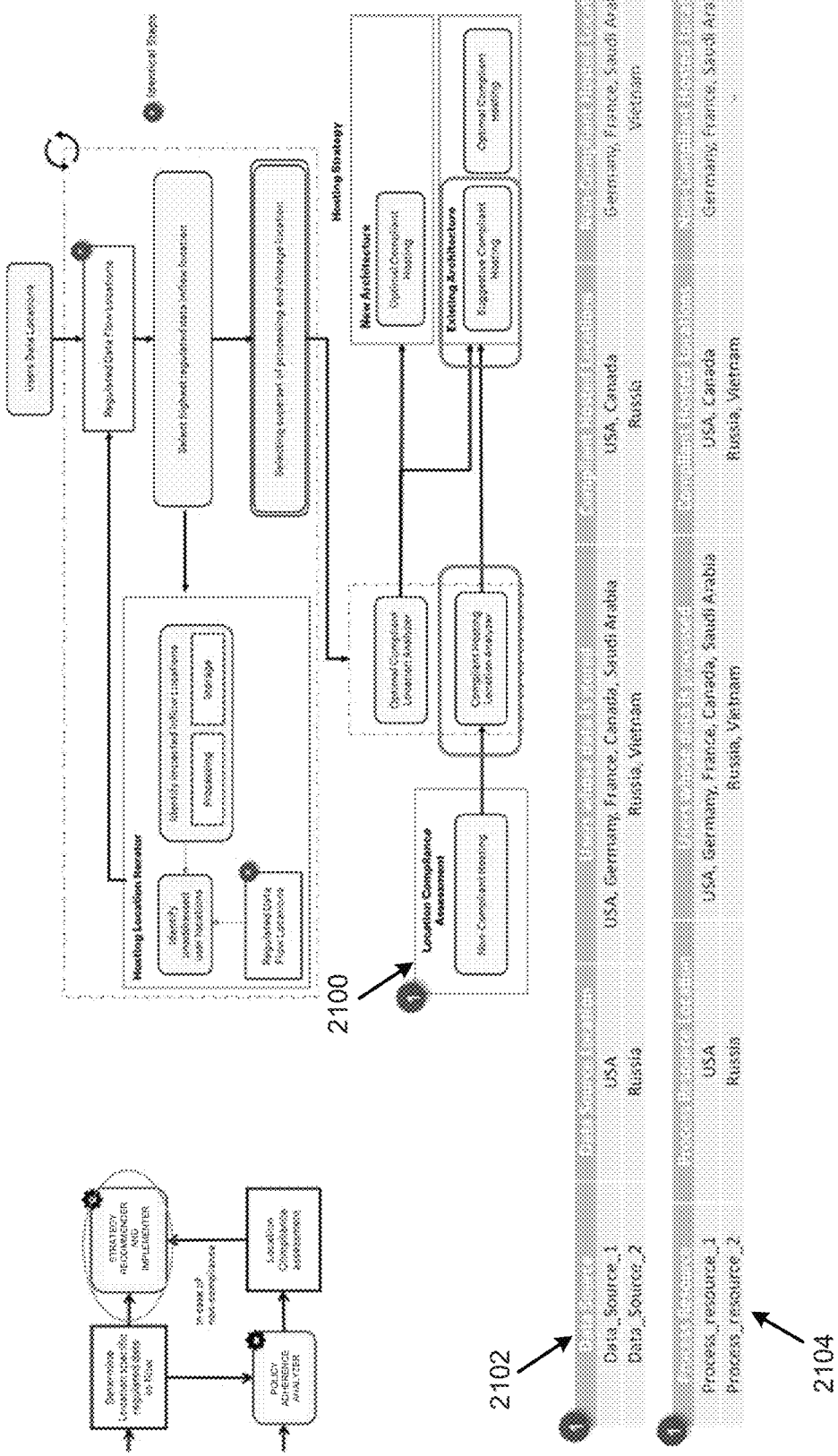
FIG. 21 illustrates an existing application strategy recommender to illustrate operation of the policy-based application architecture generation apparatus of FIG. 1 in accordance with an example of the present disclosure.

FIG. 21 illustrates an existing application strategy recommender to illustrate operation of the apparatus 100 in accordance with an example of the present disclosure.

Referring to FIG. 21, the location compliance assessment at 2100 is illustrated at 2102 and 2104. At 2102, with respect to the data source location for the United States, compliant host locations are shown as including the United States and Canada, With respect to the information at 2102 and 2104, this information may represent the output from the policy adherence analyzer 140 and depict the compliant and non-compliant locations for a particular hosting location. The non-compliant locations may be fed into the compliant hosting location analyzer (part of the strategy recommender and implementer) to provide with optimal compliant locations, FIG. 22 illustrates an existing application strategy recommender to illustrate operation of the apparatus 100 in accordance with an example of the present disclosure.

Figure 22:
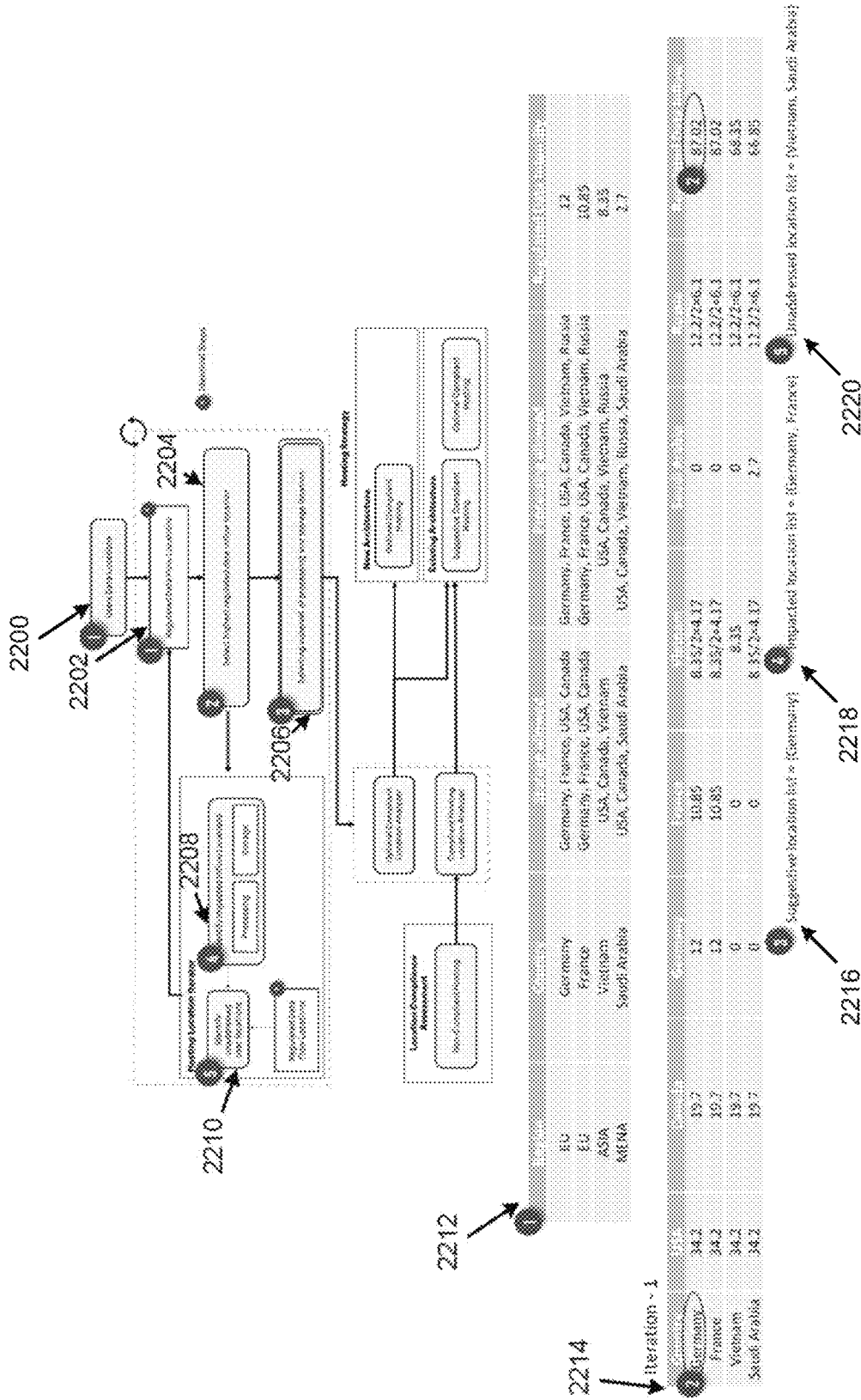
FIG. 22 illustrates an existing application strategy recommender to illustrate operation of the policy-based application architecture generation apparatus of FIG. 1 in accordance with an example of the present disclosure.

Referring to FIG. 22, user data locations 2200 and regulated data flow locations 2202, select highest regulated data inflow location 2204, selecting superset of processing and storage location 2206, identified impact inflow locations 2208, and identified unaddressed user locations 2210, are illustrated at 2212, 2214, 2216, 2218, and 2220, respectively. In this regard, the regulated data flow locations 2202 show a value for Germany and France of 87.05. The suggestive location list at 2216 includes Germany.

With respect to the table at 2212, this information may represent the subset of non-compliant locations provided by the policy adherence analyzer 140. The corresponding countries whose data can be stored or processed in for each location is listed along with their corresponding data intensity value.

With respect to the table at 2214, this table depicts the determination of regulated data inflow value for the subset of non-compliant locations. As can be seen, Germany and France have the highest regulated data inflow value, and thus Germany may be prioritized based on other factors such as user volume percentage.

With respect to the tables at 2216, 2218, and 2220, as Germany is picked as one of the hosting location, it is put under the suggestive list. Impacted list locations may depict the locations in the subset whose data can inflow for either storage and processing into Germany. For Germany datacenter, both storage and processing of Germany and France data is allowed, and hence Germany and France are in the impacted list. Unaddressed locations may depict the locations from the non-compliant subset whose data inflow value has not still been addressed.

With respect to FIGS. 7 and 22, this information is used to determine the optimal compliant alternative locations for the non-compliant hosting of an already existing architecture.

Figure 23:
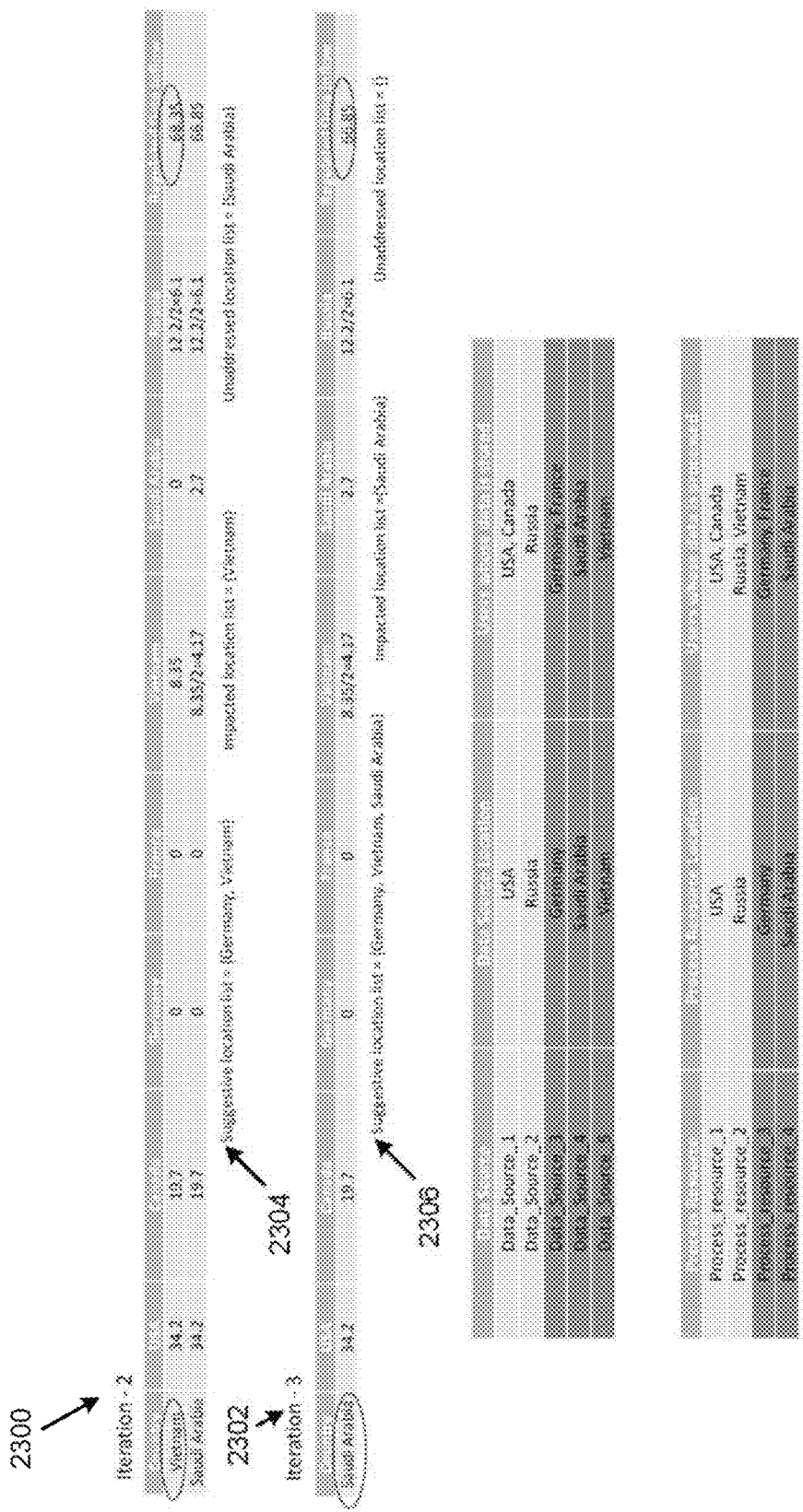
FIG. 23 illustrates an existing application strategy recommender suggestive compliant locations to illustrate operation of the policy-based application architecture generation apparatus of FIG. 1 in accordance with an example of the present disclosure.

FIG. 23 illustrates an existing application strategy recommender suggestive compliant locations to illustrate operation of the apparatus 100 in accordance with an example of the present disclosure.

Referring to FIG. 23, regulated data inflow values for different iterations, such as iteration-2 and iteration-3 are shown at 2300 and 2302. The suggestive location list at 2304 includes Germany and Vietnam, and the suggestive location list at 2306 includes Germany, Vietnam, and Saudi Arabia.

With respect to the tables at 2300 and 2302, iterations in the strategy recommender and implementer 146 may continue until all of the locations, in this case, the set of non-compliant hosting locations are addressed. Since Germany and its impacted location Germany and France are addressed in the iteration 1 as shown in 2214, the remaining unaddressed locations are iterated over.

With respect to FIGS. 7 and 23, these iterations may be used to determine the optimal hosting locations. The final suggestive location list shows the locations for hosting based on the storage and/or processing requirements, FIG. 24 illustrates an existing application architecture to illustrate operation of the apparatus 100 in accordance with an example of the present disclosure.

Figure 24:
FIG. 24 illustrates an existing application architecture to illustrate operation of the policy-based application architecture generation apparatus of FIG. 1 in accordance with an example of the present disclosure.

Referring to FIG. 24, application software may be migrated to the cloud to ensure availability and scalability. Load balancers may be used to balance load based on the user set parameters such as service fit, load equilibrium, application latency etc. Based on the ever-increasing incorporation and stringency of regulations and policies, distribution of load/request may also be governed by these policies. In this regard, FIG. 24 may depict the scenario of a load balancer using the strategy recommender and implementer 146 to identify compliant locations for storage and processing for a cluster, such as for Russia and the United States, based on the user spread.

FIG. 24 depicts the scenario of hosting location USA (or US) and Russia for storage and processing of users data from USA, Canada, Germany, France, Saudi Arabia, Russia and Vietnam. FIG. 24 illustrates the demarcation of user data for storage and processing in each hosted location. This information may be fed into the strategy recommender and implementer 146 to understand the compliant and non-compliant locations, which can be controlled by the load balancer to redirect the traffic to compliant locations and alternative complaint locations as suggested for the non-complaint locations of the existing architecture.

Figure 25:
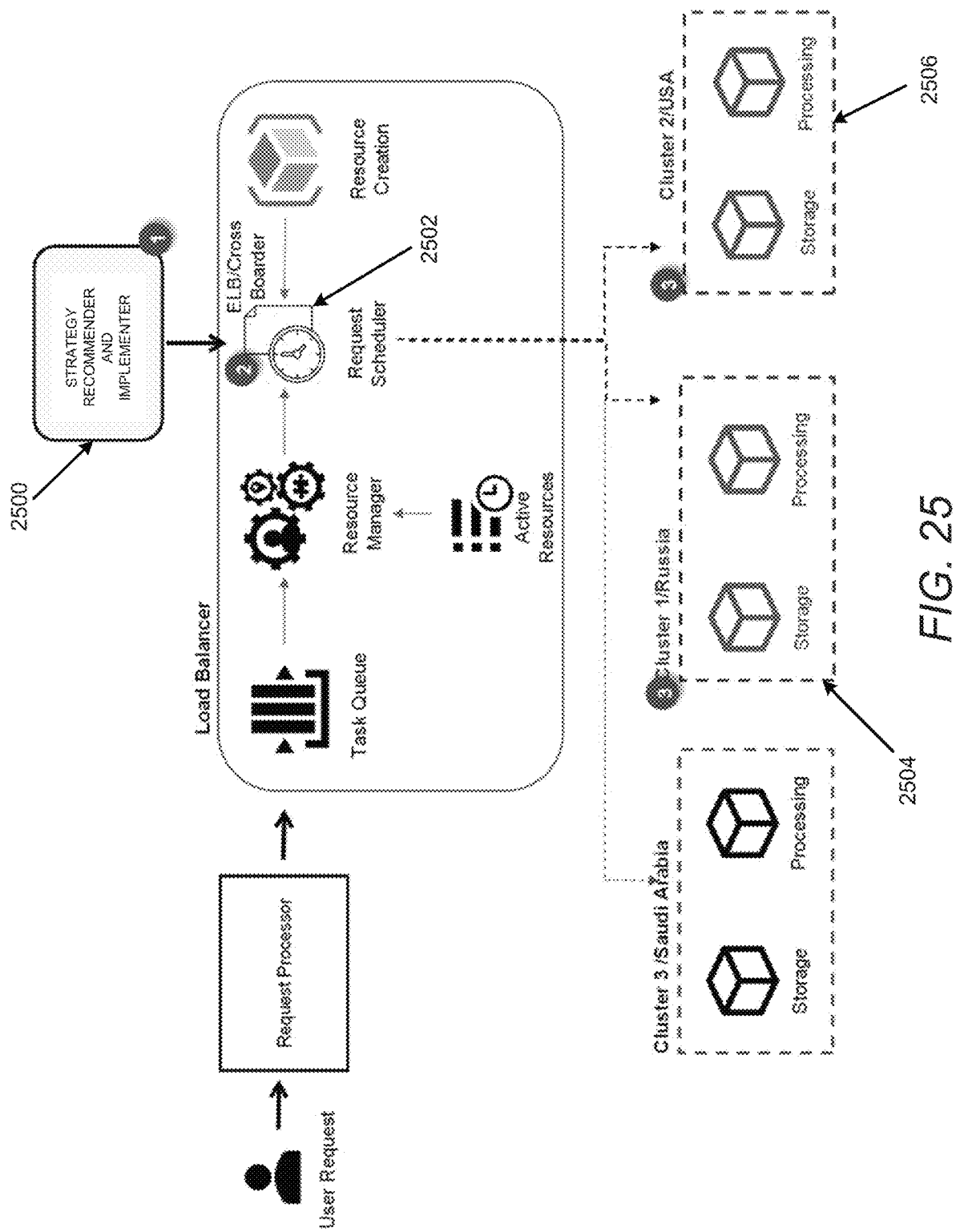
FIG. 25 illustrates an existing application strategy recommender policy aware re-architecture to illustrate operation of the policy-based application architecture generation apparatus of FIG. 1 in accordance with an example of the present disclosure.

FIG. 25 illustrates an existing application strategy recommender policy aware re-architecture to illustrate operation of the apparatus 100 in accordance with an example of the present disclosure.

Referring to FIG. 25, at block 2500, the strategy recommender and implementer 146 may evaluate the architecture for compliance, A request scheduler 2502 may identify a new compliant location along with resource for storage and processing. As depicted, location the USA stores regulated data of users from locations (USA, Canada, Germany, France, Saudi Arabia), and using this insight, the request scheduler may scale a new instance at another location which is Saudi Arabia. This is because, as per the policies, the Saudi Arabian users' data needs to be stored and processed within the country, which was making the USA location non-compliant. Next, this hosting location may cater to any new request coming for Saudi Arabian users as well as the existing stored regulated data in the USA can be moved to the Saudi Arabia instance for compliance.

Figure 26:
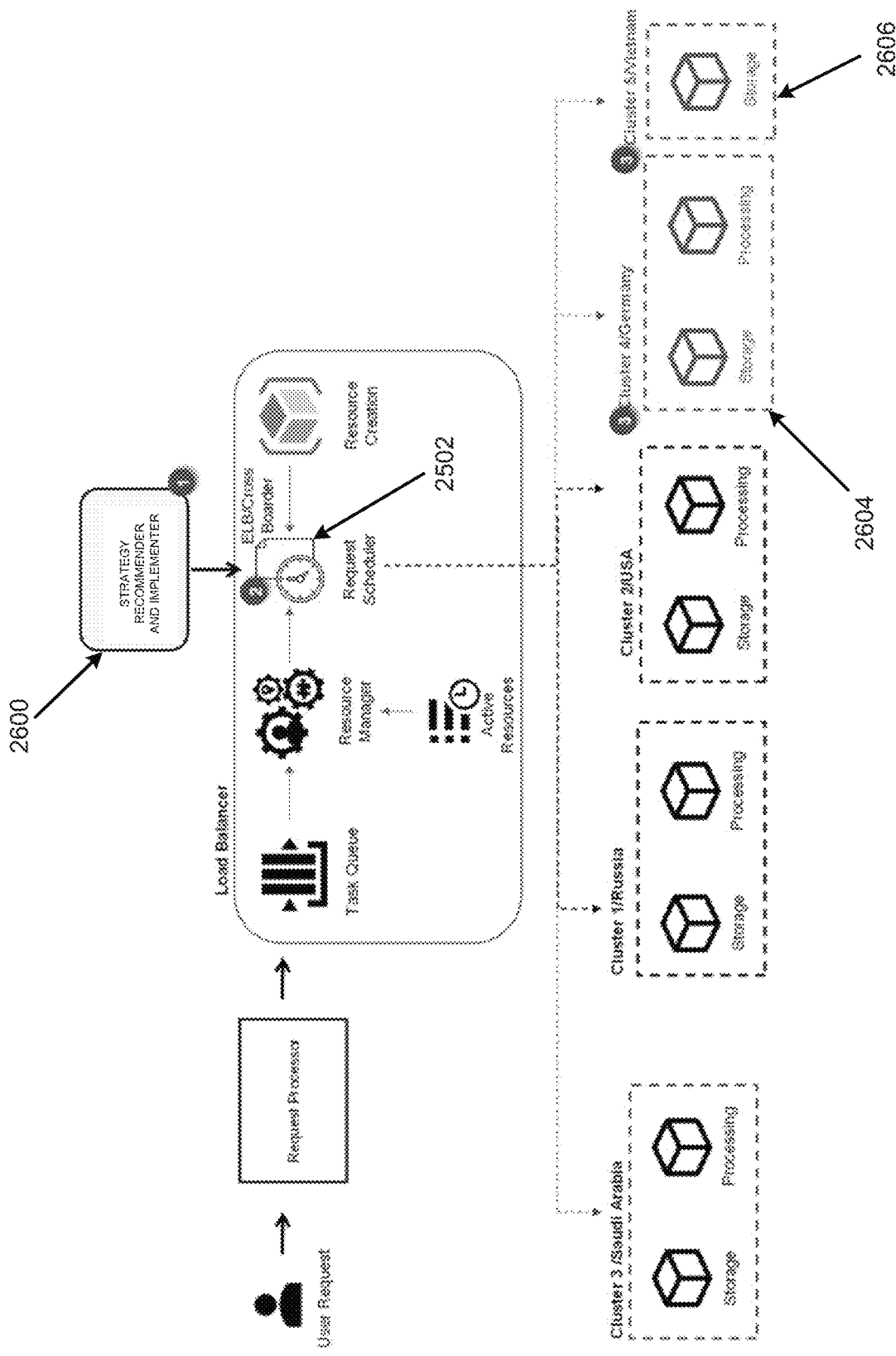
FIG. 26 illustrates an existing application strategy recommender policy aware re-architecture to illustrate operation of the policy-based application architecture generation apparatus of FIG. 1 in accordance with an example of the present disclosure.

FIG. 26 illustrates an existing application strategy recommender policy aware re-architecture to illustrate operation of the apparatus 100 in accordance with an example of the present disclosure.

Referring to FIG. 26, at block 2600, the strategy recommender and implementer 146 may evaluate the architecture for compliance. The request scheduler 2502 may spawn a new complaint resource for storage and processing at new compliant locations Germany 2604 and Vietnam 2606 based on the assessment from the strategy recommender and implementer 146 which now makes the entire application compliant with respect to the data residency policies of all user locations.

Figure 27:
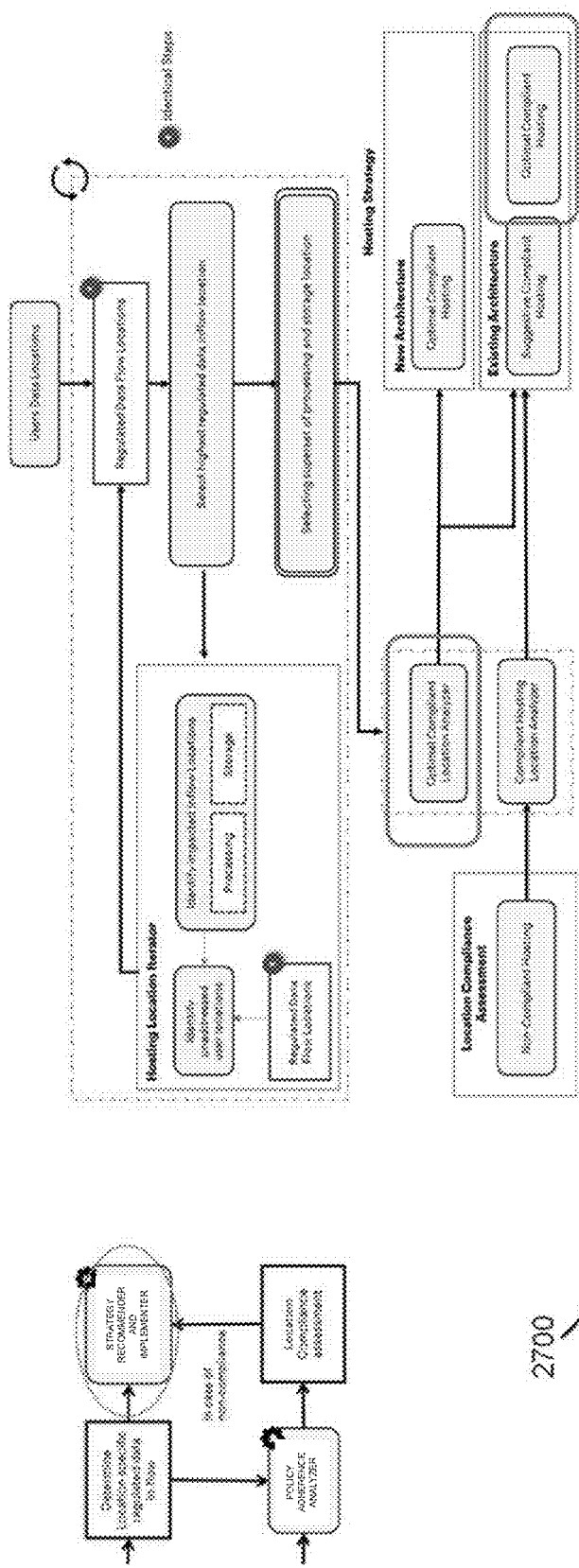
FIG. 27 illustrates an existing application strategy recommended optimal architecture suggestion to illustrate operation of the policy-based application architecture generation apparatus of FIG. 1 in accordance with an example of the present disclosure.

FIG. 27 illustrates an existing application strategy recommended optimal architecture suggestion to illustrate operation of the apparatus 100 in accordance with an example of the present disclosure.

Referring to FIG. 27, as shown at 2700, regulated data intensity scores for countries such as the United States, Canada, Germany, France, Vietnam, Saudi Arabia, and Russia, are respectively shown as 34.2, 19.7, 12, 10.85, 8.35, 2.7, and 12.2. The regulated data intensity score determined for each location may then be used to determine the regulated data in-flow values for each location.

Figure 28:
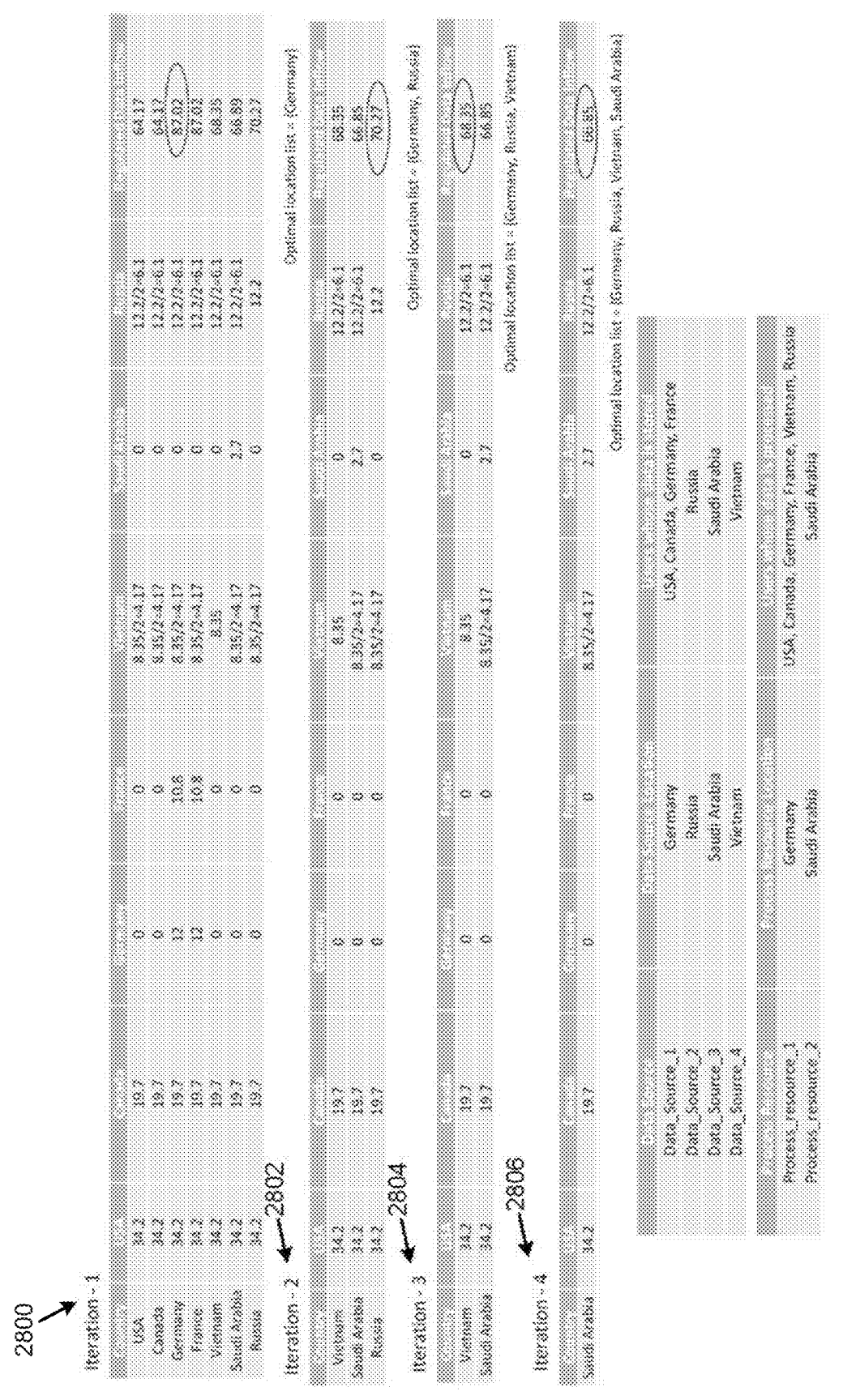

FIG. 28 illustrates an existing application strategy recommended optimal architecture recommendation to illustrate operation of the apparatus 100 in accordance with an example of the present disclosure.

Referring to FIG. 28, regulated data inflow values for different iterations, such as iteration-1, iteration-2, iteration-3, and iteration-4 are shown at 2800, 2802, 2804, and 2806. At table 2800, the regulated data in-flow value for each location may be determined using the regulated data intensity values of the locations for which either the storage or processing operation is allowed. For example, location USA can store user data of locations (USA, Canada) and process user data of locations (USA, Canada, Vietnam Russia). In order to determine the regulated data in-flow for USA, the regulated data Intensity value for USA may be summed (e.g., 34.2 as both storage and processing operations are allowed), similarly for Canada (e.g., 19.7). However, for Vietnam and Russia, only processing is allowed and not storage, in which case the intensity value is divided by 2 (as there are only two operations considered) e.g., 8.35/2=4.17 for Vietnam and 12.2/2=6.1 for Russia. For other locations, Germany, France and Saudi Arabia, since no operation is allowed, hence the value is 0. The summation of all of the intensity scores for locations for USA gives the regulated data in-flow value for USA (e.g., 34.2+19.7+4.17+6.1=64.17). In Iteration-1, Germany is added into the optimal location list due to its regulated data in-flow value which is highest among all. Similarly, in the next iterations, the next location with the highest value which is not yet covered with respect to data operations may be identified. For example, iteration-2 identifies Russia, iteration-3 determines Vietnam and iteration-4 covers Saudi Arabia. As all locations are covered, the optimal list containing locations {Germany, Russia, Vietnam, Saudi Arabia} includes optimal hosting location options for a compliant application.

Figure 29:
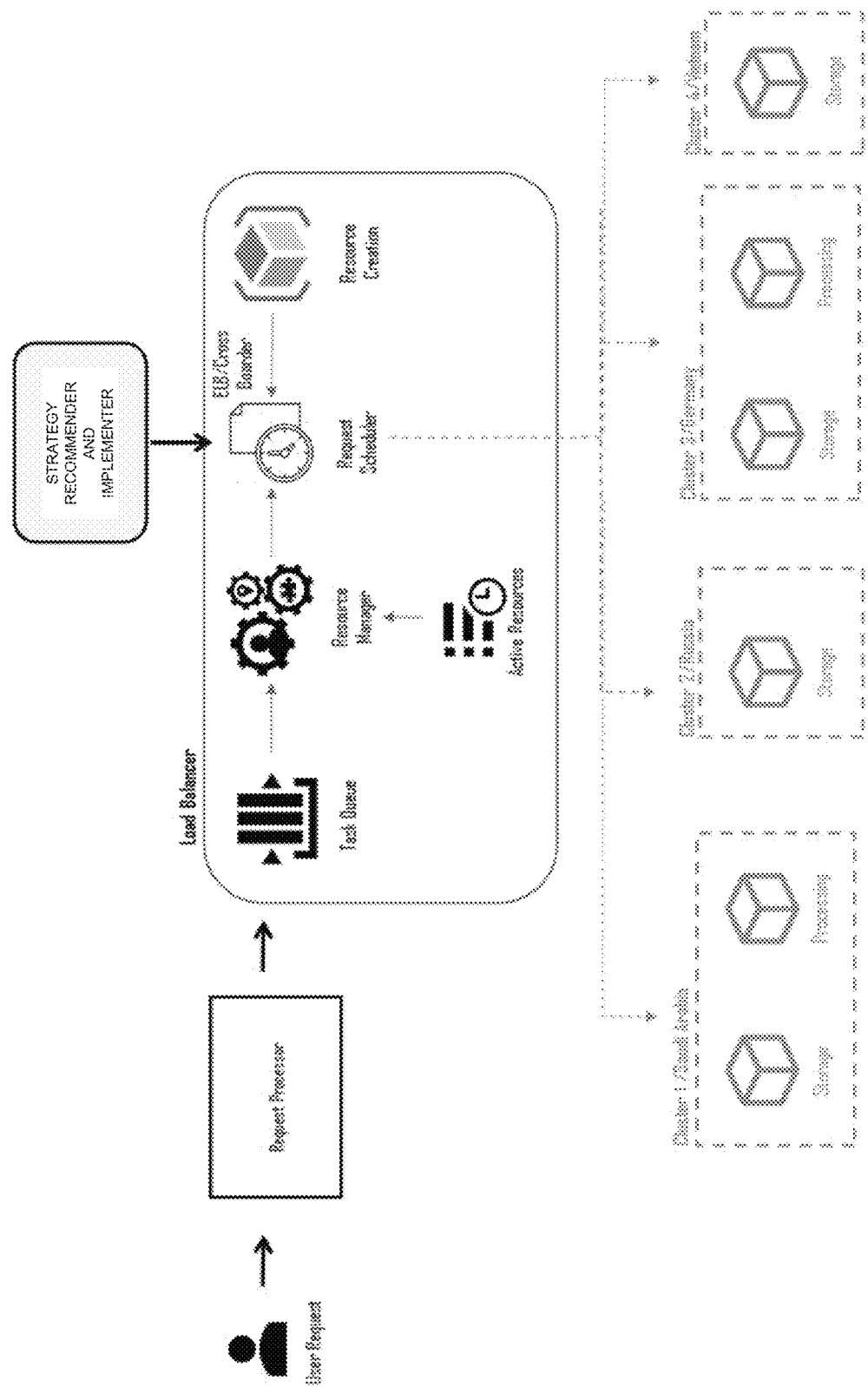
FIG. 29 illustrates an new application strategy recommended optimal policy aware re-architecture to illustrate operation of the policy-based application architecture generation apparatus of FIG. 1 in accordance with an example of the present disclosure.

FIG. 29 illustrates an new application strategy recommended optimal policy aware re-architecture to illustrate operation of the apparatus 100 in accordance with an example of the present disclosure.

The optimal hosting options may then be used by the request scheduler to spawn hosting locations as suggested by the strategy recommender and implementer 146. Hence, Saudi Arabia, Russia, Germany and Vietnam hosting locations are instantiated, and resources are allocated for storage and processing of the data.

With respect to an existing application, the strategy recommender and implementer 146 may implement horizontal scaling of resources. In this regard, application software may be migrated to the cloud to ensure availability and scalability. One of the approaches may include horizontal scaling, wherein new resources may be added to different location and data centers to incorporate the load of requests. In this regard, reasons for horizontal scaling may include resilience, cost and diverse user spread. Algorithms for scaling may be designed to suit application behavior, data requirements, etc. With respect to the ever-increasing incorporation and stringency of regulations and policies, scaling of resources may also be based on compliant locations. In this regard, FIG. 30 may depict the scenario of incorporating a new request, for example, from Saudi Arabia, into an already existing architecture.

Figure 30:
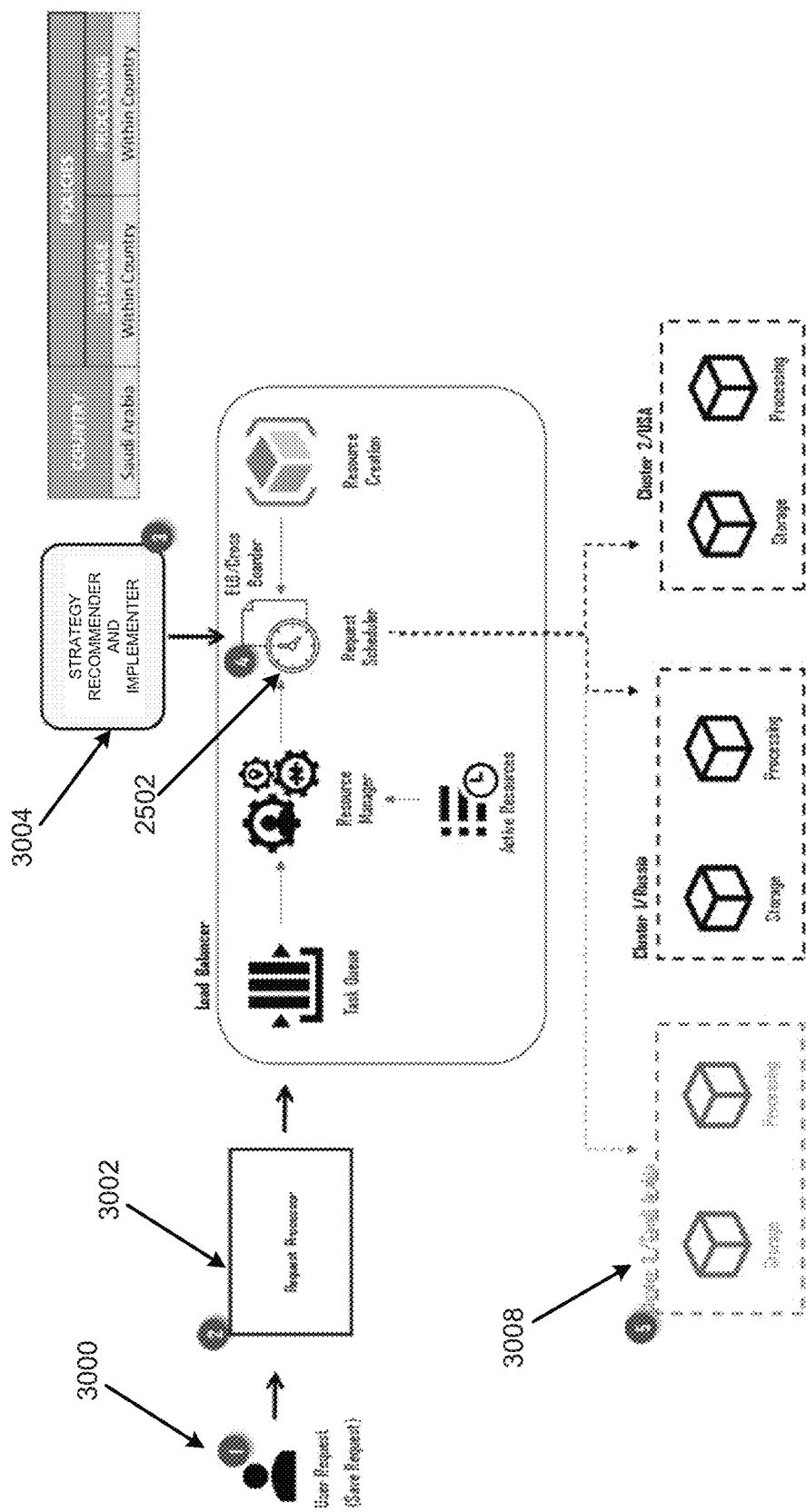
FIG. 30 illustrates an existing application strategy recommender in case of new request for horizontal scaling of sources to illustrate operation of the policy-based application architecture generation apparatus of FIG. 1 in accordance with an example of the present disclosure.

FIG. 30 illustrates an existing application strategy recommender in case of new request for horizontal scaling of sources to illustrate operation of the apparatus 100 in accordance with an example of the present disclosure.

Referring to FIG. 30, at block 3000, a user request may be received, for example, from Saudi Arabia to add a new user's data. The request processor 3002 may evaluate the legitimacy of the request. Based on a determination that request complies with norms, the request may be forwarded to add new user data. At block 3004, the strategy recommender and implementer 146 may identify that the current request cannot be handled in either of the instantiated locations of Russia and USA, and based on policies determines that it needs to be handled in location Saudi Arabia only which is not instantiated yet. The strategy recommender and implementer 146 may send the strategy 148 to the request scheduler 2502 which then instantiates resources at new hosting location—Saudi Arabia and then forwards a request for handling. At block 3008, the request may be sent to the Saudi Arabia cluster for storage and processing.

Figure 31:
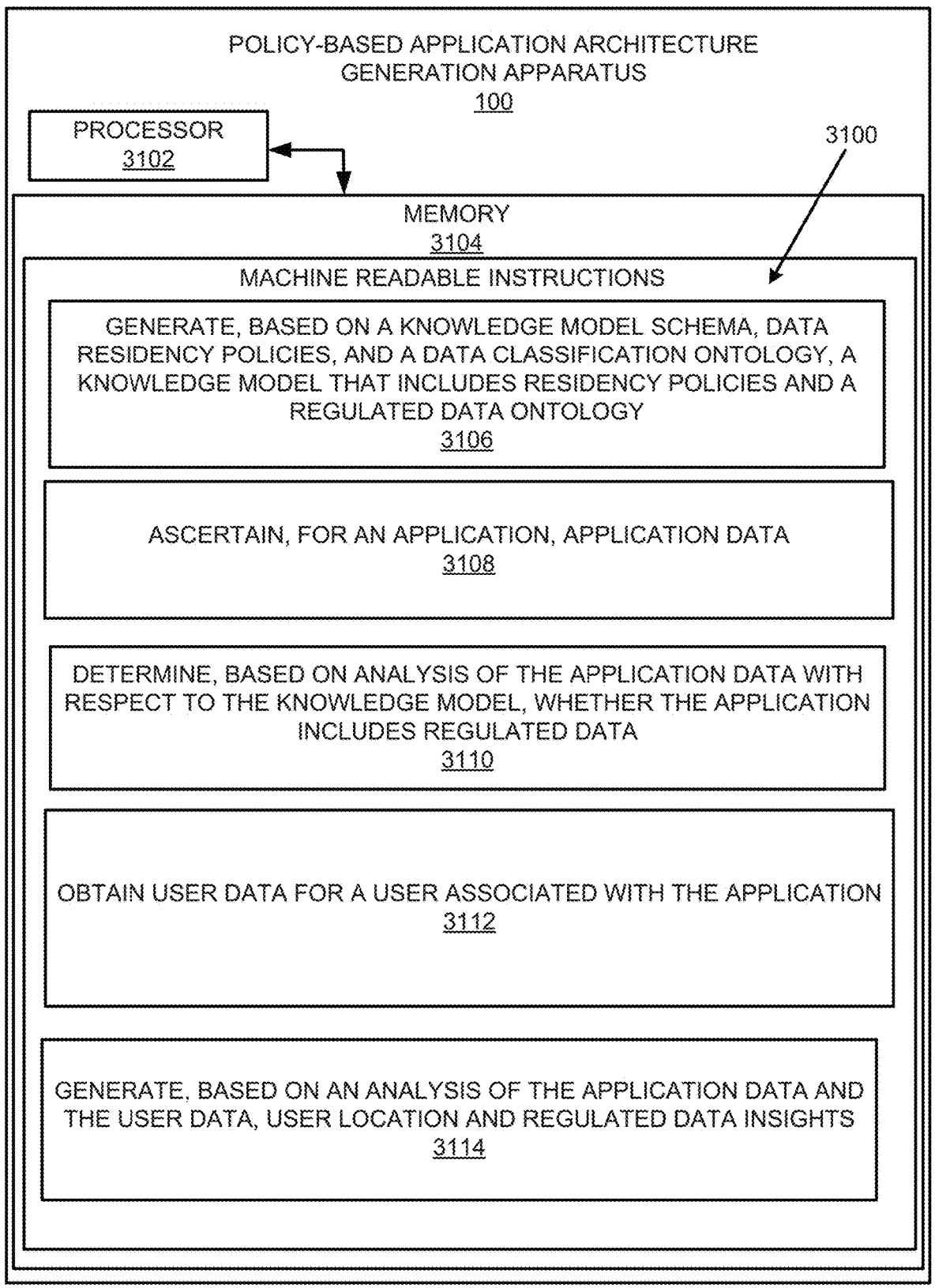
FIG. 31 illustrates an example block diagram for policy-based application architecture generation in accordance with an example of the present disclosure.
Figure 31:
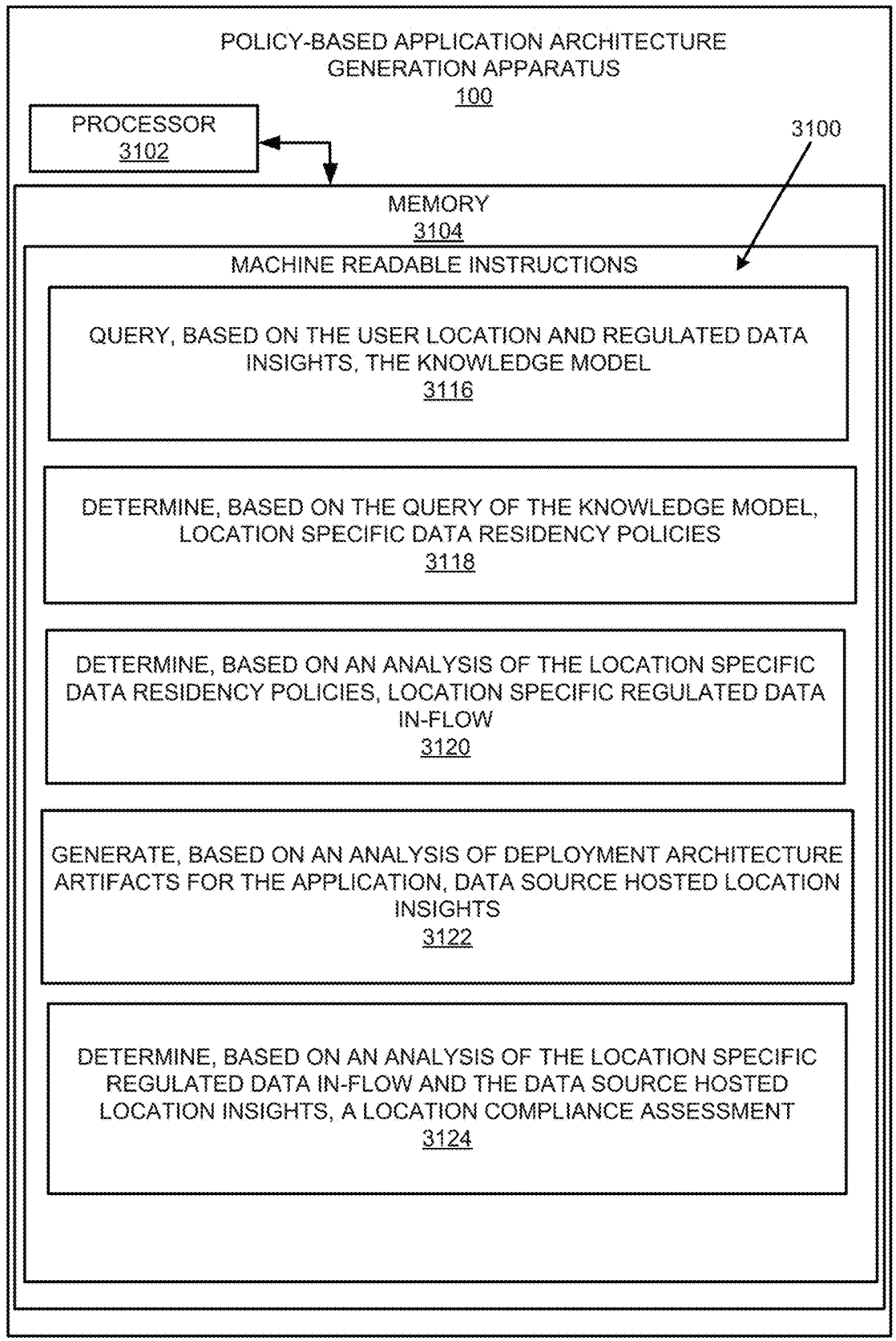
Figure 31:
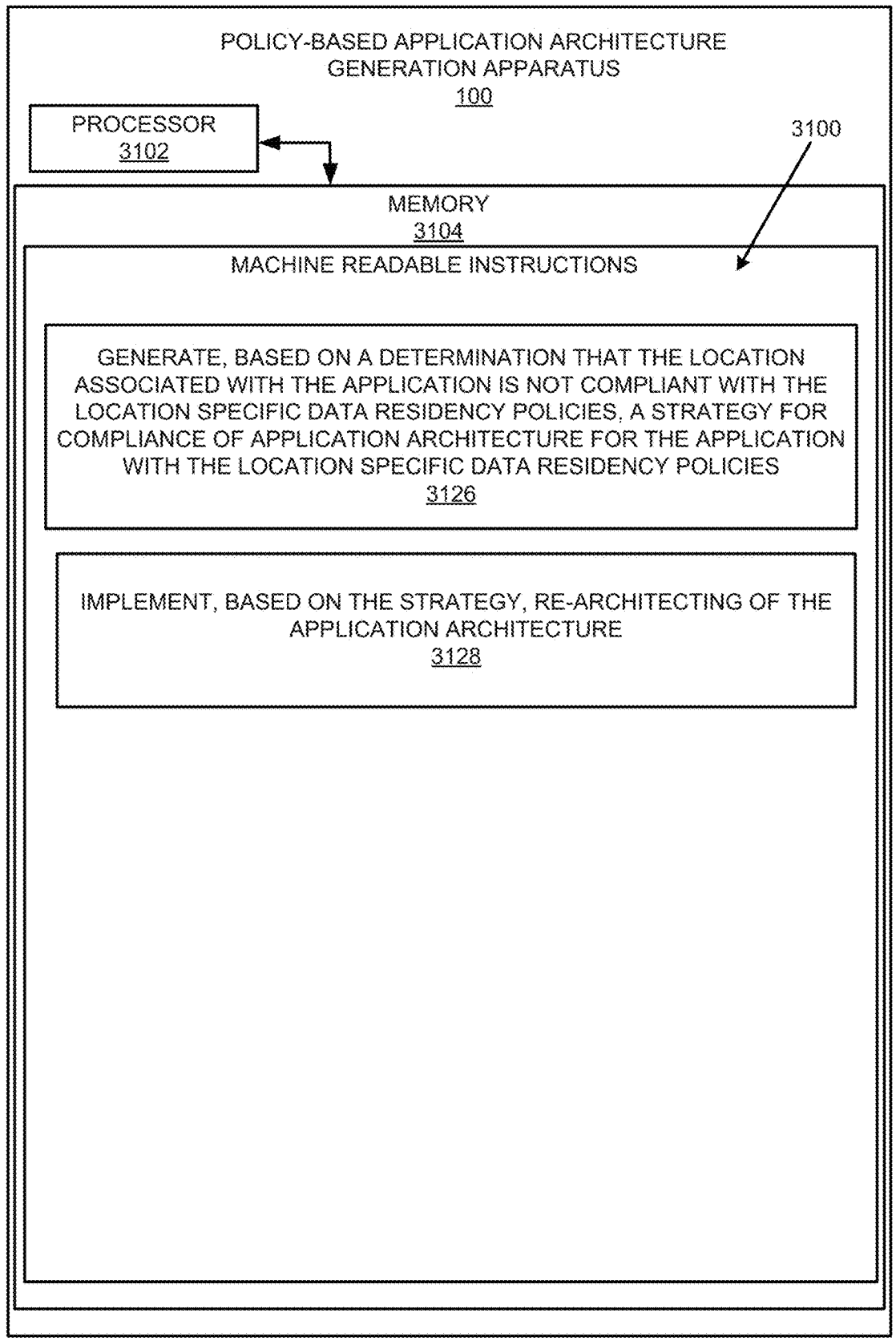
Figure 33:
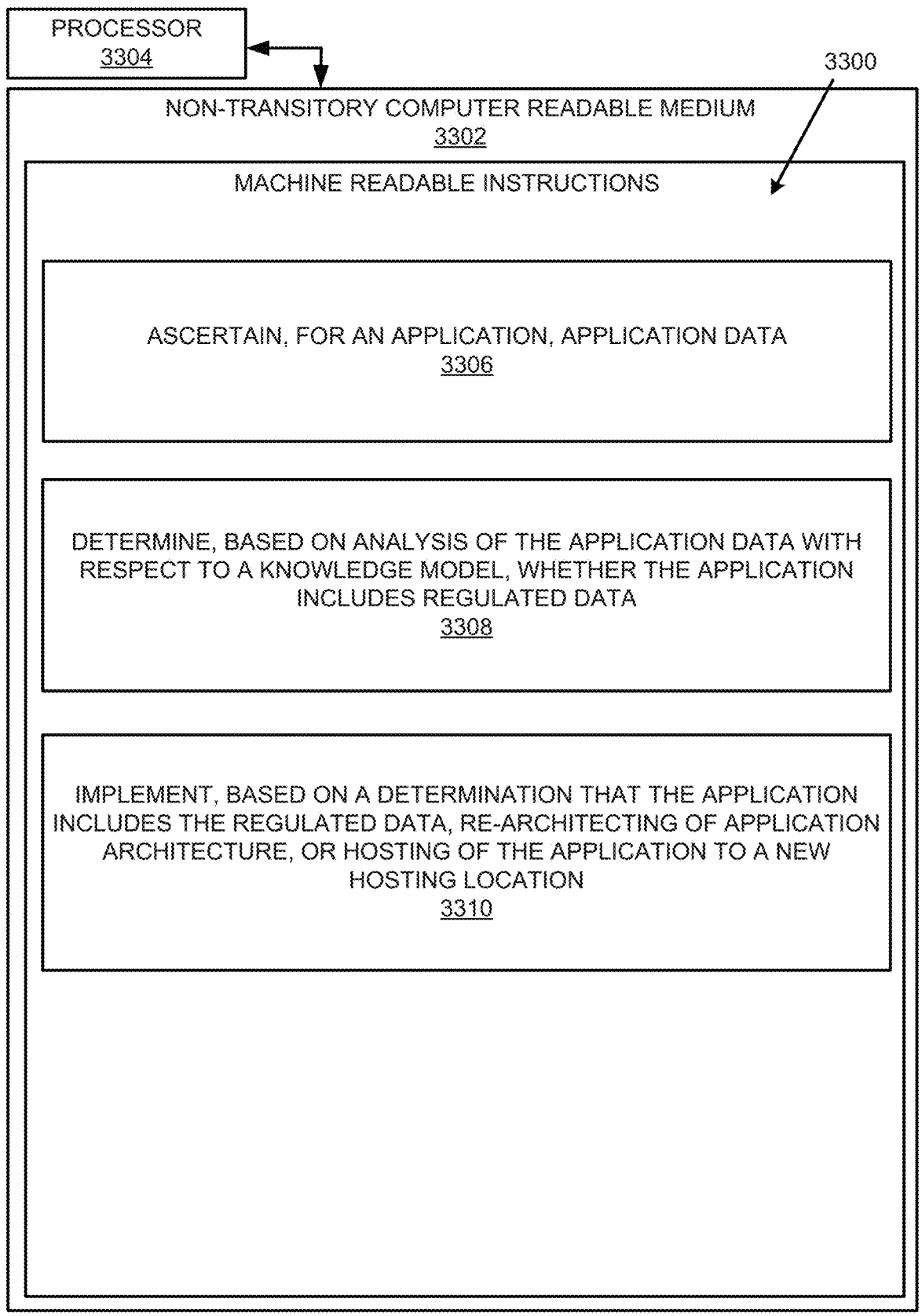
FIG. 33 illustrates a further example block diagram for policy-based application architecture generation in accordance with another example of the present disclosure.

FIGS. 31-33 respectively illustrate an example block diagram 3100, a flowchart of an example method 3200, and a further example block diagram 3300 for policy-based application architecture generation, according to examples. The block diagram 3100, the method 3200, and the block diagram 3300 may be implemented on the apparatus 100 described above with reference to FIG. 1 by way of example and not of limitation. The block diagram 3100, the method 3200, and the block diagram 3300 may be practiced in other apparatus. In addition to showing the block diagram 3100, FIG. 31 shows hardware of the apparatus 100 that may execute the instructions of the block diagram 3100. The hardware may include a processor 3102, and a memory 3104 storing machine readable instructions that when executed by the processor cause the processor to perform the instructions of the block diagram 3100. The memory 3104 may represent a non-transitory computer readable medium. FIG. 32 may represent an example method for policy-based application architecture generation, and the steps of the method. FIG. 33 may represent a non-transitory computer readable medium 3302 having stored thereon machine readable instructions to provide policy-based application architecture generation according to an example. The machine readable instructions, when executed, cause a processor 3304 to perform the instructions of the block diagram 3300 also shown in FIG. 33.

The processor 3102 of FIG. 31 and/or the processor 3304 of FIG. 33 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 3302 of FIG. 33), such as hardware storage devices (e.g., RAM (random access memory), ROM (read only memory), EPROM (erasable, programmable ROM), EEPROM (electrically erasable, programmable ROM), hard drives, and flash memory). The memory 3104 may include a RAM, where the machine readable instructions and data for a processor may reside during runtime.

Referring to FIGS. 1-31, and particularly to the block diagram 3100 shown in FIG. 31, the memory 3104 may include instructions 3106 to generate, based on a knowledge model schema 104, data residency policies 106, and a data classification ontology 108, a knowledge model 110 that includes residency policies and a regulated data ontology.

The processor 3102 may fetch, decode, and execute the instructions 3108 to ascertain, for an application 114, application data 116.

The processor 3102 may fetch, decode, and execute the instructions 3110 to determine, based on analysis of the application data 116 with respect to the knowledge model 110, whether the application 114 includes regulated data.

The processor 3102 may fetch, decode, and execute the instructions 3112 to obtain user data 120 for a user 122 associated with the application 114.

The processor 3102 may fetch, decode, and execute the instructions 3114 to generate, based on an analysis of the application data 116 and the user data 120, user location and regulated data insights 124.

The processor 3102 may fetch, decode, and execute the instructions 3116 to query, based on the user location and regulated data insights 124, the knowledge model 110.

The processor 3102 may fetch, decode, and execute the instructions 3118 to determine, based on the query of the knowledge model 110, location specific data residency policies 128.

The processor 3102 may fetch, decode, and execute the instructions 3120 to determine, based on an analysis of the location specific data residency policies 106, location specific regulated data in-flow 132.

The processor 3102 may fetch, decode, and execute the instructions 3122 to generate, based on an analysis of deployment architecture artifacts 136 for the application 114, data source hosted location insights 138.

The processor 3102 may fetch, decode, and execute the instructions 3124 to determine, based on an analysis of the location specific regulated data in-flow 132 and the data source hosted location insights 138, a location compliance assessment 142.

The processor 3102 may fetch, decode, and execute the instructions 3126 to generate, based on a determination that the location 144 associated with the application 114 is not compliant with the location specific data residency policies 106, a strategy 148 for compliance of application architecture 150 for the application 114 with the location specific data residency policies 106.

The processor 3102 may fetch, decode, and execute the instructions 3128 to implement, based on the strategy 148, re-architecting of the application architecture 150.

Referring to FIGS. 1-30 and 32, and particularly FIG. 32, for the method 3200, at block 3202, the method may include generating, based on a knowledge model schema 104, data residency policies 106, and a data classification ontology 108, a knowledge model 110 that includes residency policies and a regulated data ontology.

At block 3204, the method may include ascertaining, for an application 114, application data 116.

At block 3206, the method may include determining, based on analysis of the application data 116 with respect to the knowledge model 110, whether the application 114 includes regulated data.

At block 3208, the method may include implementing, based on a determination that the application includes the regulated data, re-architecting of application architecture, or hosting of the application to a new hosting location. In this regard, the method may include implementing, based on the strategy, the re-architecting of the application architecture. Alternatively, the method may include implementing, based on the strategy, the hosting of the application to the new hosting location.

Referring to FIGS. 1-30 and 33, and particularly FIG. 33, for the block diagram 3300, the non-transitory computer readable medium 3302 may include instructions 3306 to ascertain, for an application 114, application data 116.

The processor 3304 may fetch, decode, and execute the instructions 3308 to determine, based on analysis of the application data 116 with respect to a knowledge model 110, whether the application 114 includes regulated data.

The processor 3304 may fetch, decode, and execute the instructions 3310 to implement, based on a determination that the application includes the regulated data, re-architecting of application architecture, or hosting of the application to a new hosting location.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A policy-based application architecture generation apparatus comprising:
　　at least one hardware processor;
　　a knowledge model instantiator, executed by the at least one hardware processor, to
　　　generate, based on a knowledge model schema, data residency policies, and a data classification ontology, a knowledge model that includes residency policies and a regulated data ontology;
　　a data analyzer, executed by the at least one hardware processor, to
　　　ascertain, for an application, application data, and determine, based on analysis of the application data with respect to the knowledge model, whether the application includes regulated data;

a file reader, executed by the at least one hardware processor, to
obtain user data for a user associated with the application,
wherein the data analyzer and the file reader generate, based on an analysis of the application data and the user data, user location and regulated data insights;

a knowledge model query performer, executed by the at least one hardware processor, to
query, based on the user location and regulated data insights, the knowledge model, and
determine, based on the query of the knowledge model, location specific data residency policies;

a regulated data in-flow analyzer, executed by the at least one hardware processor, to
determine, based on an analysis of the location specific data residency policies, location specific regulated data in-flow;

an architecture reader, executed by the at least one hardware processor, to
generate, based on an analysis of deployment architecture artifacts for the application, data source hosted location insights;

a policy adherence analyzer, executed by the at least one hardware processor, to
determine, based on an analysis of the location specific regulated data in-flow and the data source hosted location insights, a location compliance assessment, wherein the location compliance assessment includes an indication of whether a location associated with the application is compliant or not compliant with the location specific data residency policies; and a strategy recommender and implementer, executed by the at least one hardware processor, to
generate, based on a determination that the location associated with the application is not compliant with the location specific data residency policies, a strategy for compliance of application architecture for the application with the location specific data residency policies, and
implement, based on the strategy, re-architecting of the application architecture.

2. The policy-based application architecture generation apparatus according to claim 1, wherein the data analyzer is executed by the at least one hardware processor, to:
determine the regulated data for the location associated with the application relative to regulated data for a plurality of locations.

3. The policy-based application architecture generation apparatus according to claim 1, wherein the data analyzer is executed by the at least one hardware processor, to:
determine a total number of unique users for the location associated with the application relative to a total numbers of users across all locations.

4. The policy-based application architecture generation apparatus according to claim 1, wherein the data analyzer is executed by the at least one hardware processor to determine, based on analysis of the application data with respect to the knowledge model, whether the application includes regulated data by:
determining a user percentage as a function of a user data for the location associated with the application relative to user data for all locations;

determining the regulated data as a function of regulated records for the location associated with the application relative to regulated records for all locations; and
determining a regulated data intensity as a function of the user percentage and the regulated data.

5. The policy-based application architecture generation apparatus according to claim 1, wherein the strategy recommender and implementer is executed by the at least one hardware processor to:
generate, based on the location compliance assessment, an optimum architecture for the application by performing location prioritization for deployment.

6. The policy-based application architecture generation apparatus according to claim 1, wherein the regulated data in-flow analyzer is executed by the at least one hardware processor to determine, based on the analysis of the location specific data residency policies, location specific regulated data in-flow by:
determining a regulated data in-flow value as a function of a regulated data intensity, and a sum of operations allowed relative to a total number of operations.

7. The policy-based application architecture generation apparatus according to claim 6, the regulated data in-flow analyzer is executed by the at least one hardware processor to:
determine, based on the regulated data in-flow value, a processing datacenter for processing the application data by identifying the processing datacenter including the highest regulated data in-flow value.

8. A method for policy-based application architecture generation, the method comprising:
generating, by at least one hardware processor based on a knowledge model schema, data residency policies, and a data classification ontology, a knowledge model that includes residency policies and a regulated data ontology;
ascertaining, by the at least one hardware processor, for an application, application data;
determining, by the at least one hardware processor, based on analysis of the application data with respect to the knowledge model, whether the application includes regulated data;
obtaining, by the at least one hardware processor, user data for a user associated with the application;
generating, by the at least one hardware processor based on an analysis of the application data and the user data, user location and regulated data insights;
querying, by the at least one hardware processor based on the user location and regulated data insights, the knowledge model;
determining, by the at least one hardware processor based on the query of the knowledge model, location specific data residency policies;
determining, by the at least one hardware processor based on an analysis of the location specific data residency policies, location specific regulated data in-flow;
generating, by the at least one hardware processor based on an analysis of deployment architecture artifacts for the application, data source hosted location insights;
determining, by the at least one hardware processor based on an analysis of the location specific regulated data in-flow and the data source hosted location insights, a location compliance assessment, wherein the location compliance assessment includes an indication of whether a location associated with the application is compliant or not compliant with the location specific data residency policies;

generating, by the at least one hardware processor based on a determination that the location associated with the application is not compliant with the location specific data residency policies, a strategy for compliance of application architecture for the application with the location specific data residency policies, and implementing, by the at least one hardware processor based on the strategy, re-architecting of the application architecture.

9. The method according to claim 8, further comprising: determining, by the at least one hardware processor, the regulated data for the location associated with the application relative to regulated data for a plurality of locations.

10. The method according to claim 8, further comprising: determining, by the at least one hardware processor, a total number of unique users for the location associated with the application relative to a total numbers of users across all locations.

11. The method according to claim 8, further comprising: generating, by the at least one hardware processor based on the location compliance assessment, an optimum architecture for the application by performing location prioritization for deployment.

12. The method according to claim 8, wherein determining, based on analysis of the application data with respect to the knowledge model, whether the application includes regulated data further comprises:

determining, by the at least one hardware processor, a user percentage as a function of a user data for the location associated with the application relative to user data for all locations;

determining, by the at least one hardware processor, the regulated data as a function of regulated records for the location associated with the application relative to regulated records for all locations; and determining, by the at least one hardware processor, a regulated data intensity as a function of the user percentage and the regulated data.

13. The method according to claim 12, wherein determining, based on the analysis of the location specific data residency policies, location specific regulated data in-flow further comprises: determining, by the at least one hardware processor, a regulated data in-flow value as a function of the regulated data intensity, and a sum of operations allowed relative to a total number of operations.

14. The method according to claim 13, further comprising: determining, by the at least one hardware processor based on the regulated data in-flow value, a processing datacenter for processing the application data by identifying the processing datacenter including the highest regulated data in-flow value.

15. A non-transitory computer readable medium having stored thereon machine readable instructions, the machine readable instructions, when executed by at least one hardware processor, cause the at least one hardware processor to:

generate, based on a knowledge model schema, data residency policies, and a data classification ontology, a knowledge model that includes residency policies and a regulated data ontology;

ascertain, for an application, application data;

determine, based on analysis of the application data with respect to the knowledge model, whether the application includes regulated data;

obtain user data for a user associated with the application;

generate, based on an analysis of the application data and the user data, user location and regulated data insights;

query, based on the user location and regulated data insights, the knowledge model, determine, based on the query of the knowledge model, location specific data residency policies;

determine, based on an analysis of the location specific data residency policies, location specific regulated data in-flow;

generate, based on an analysis of deployment architecture artifacts for the application, data source hosted location insights;

determine, based on an analysis of the location specific regulated data in-flow and the data source hosted location insights, a location compliance assessment, wherein the location compliance assessment includes an indication of whether a location associated with the application is compliant or not compliant with the location specific data residency policies; and generate, based on a determination that the location associated with the application is not compliant with the location specific data residency policies, a strategy for compliance of application architecture for the application with the location specific data residency policies; and implement, based on the strategy, re-architecting of the application architecture.

16. A non-transitory computer readable medium of claim 15, having stored thereon further machine readable instructions, the further machine readable instructions, when executed by at least one hardware processor, cause the at least one hardware processor to:

determine the regulated data for the location associated with the application relative to regulated data for a plurality of locations.

17. A non-transitory computer readable medium claim 15, having stored thereon further machine-readable instructions, the further machine readable instructions, when executed by at least one hardware processor, cause the at least one hardware processor to: determine a total number of unique users for the location associated with the application relative to a total numbers of users across all locations.

18. A non-transitory computer readable medium claim 15, having stored thereon further machine-readable instructions, the further machine readable instructions, when executed by at least one hardware processor, cause the at least one hardware processor to:

determine a user percentage as a function of a user data for the location associated with the application relative to user data for all locations;

determine the regulated data as a function of regulated records for the location associated with the application relative to regulated records for all locations; and determine a regulated data intensity as a function of the user percentage and the regulated data.

19. A non-transitory computer readable medium of claim 18 having stored thereon further machine-readable instructions, wherein the further machine readable instructions, to determine, based on the analysis of the location specific data residency policies, location specific regulated data in-flow cause the at least one hardware processor to: determine a regulated data in-flow value as a function of a regulated data intensity, and a sum of operations allowed relative to a total number of operations.

20. A non-transitory computer readable medium of claim 19 having stored thereon machine-readable instructions, the machine-readable instructions, when executed by at least one hardware processor, cause the at least one hardware processor to: determine, based on the regulated data in-flow value, a processing datacenter for processing the application data by identifying the processing datacenter including the highest regulated data in-flow value.

\* \* \* \* \*